(12) United States Patent
Hotta et al.

(10) Patent No.: US 11,018,378 B2
(45) Date of Patent: May 25, 2021

(54) SECONDARY BATTERY, BATTERY PACK, AND VEHICLE

(71) Applicant: KABUSHIKI KAISHA TOSHIBA, Minato-ku (JP)

(72) Inventors: Yasuyuki Hotta, Tokyo (JP); Shinsuke Matsuno, Tokyo (JP); Norio Takami, Yokohama (JP); Kazuomi Yoshima, Yokohama (JP)

(73) Assignee: Kabushiki Kaisha Toshiba, Minato-ku (JP)

(*) Notice: Subject to any disclaimer, the term of this patent is extended or adjusted under 35 U.S.C. 154(b) by 115 days.

(21) Appl. No.: 15/912,666

(22) Filed: Mar. 6, 2018

(65) Prior Publication Data

US 2019/0089012 A1   Mar. 21, 2019

(30) Foreign Application Priority Data

Sep. 19, 2017   (JP) .............................. JP2017-179370

(51) Int. Cl.
*H01M 10/38* (2006.01)
*H01M 4/485* (2010.01)
(Continued)

(52) U.S. Cl.
CPC ............ *H01M 10/38* (2013.01); *B60L 53/00* (2019.02); *H01M 4/48* (2013.01); *H01M 4/485* (2013.01);
(Continued)

(58) Field of Classification Search
None
See application file for complete search history.

(56) References Cited

U.S. PATENT DOCUMENTS 6,403,253 B1   6/2002   Wainwright et al.
2004/0197641 A1*  10/2004  Visco .................. H01M 16/003
                                                                429/137
(Continued)

FOREIGN PATENT DOCUMENTS

JP   9-508490      8/1997
JP   10-269844     10/1998
(Continued)

OTHER PUBLICATIONS

Zheng Chang et al., "A Lithium Ion Battery Using an Aqueous Electrolyte Solution", Scientific Reports, Jun. 22, 2016, pp. 1-6.
(Continued)

*Primary Examiner* — Wyatt P McConnell
(74) *Attorney, Agent, or Firm* — Oblon, McClelland, Maier & Neustadt, L.L.P.

(57) ABSTRACT

According to an embodiment, a secondary battery is provided. The secondary battery includes a positive electrode, a negative electrode, separator, and an aqueous electrolyte. The separator is located at least between the positive electrode and the negative electrode. The separator includes a composite film. The composite film includes a mixture of a polymeric material and ion conductive solid electrolyte particles having alkali metal ions conductivity. The polymeric material includes a polymer comprising a monomer unit. The monomer unit is a hydrocarbon with a functional group including at least one element selected from the group consisting of oxygen (O), sulfur (S), nitrogen (N), and fluorine (F). A ratio of the polymer in the polymeric material is not less than 70 mol %.

19 Claims, 7 Drawing Sheets

(51) Int. Cl.
  *H01M 4/48*      (2010.01)
  *H01M 4/525*     (2010.01)
  *H01M 4/58*      (2010.01)
  *H01M 10/42*     (2006.01)
  *H01M 10/46*     (2006.01)
  *H02J 7/14*      (2006.01)
  *H01M 4/505*     (2010.01)
  *B60L 53/00*     (2019.01)
  *H01M 10/36*     (2010.01)
  *H01M 50/20*     (2021.01)
  *H01M 50/446*    (2021.01)
  *B60L 7/10*      (2006.01)

(52) U.S. Cl.
  CPC ........... *H01M 4/505* (2013.01); *H01M 4/525* (2013.01); *H01M 4/5825* (2013.01); *H01M 10/36* (2013.01); *H01M 10/4257* (2013.01); *H01M 10/46* (2013.01); *H01M 50/20* (2021.01); *H01M 50/446* (2021.01); *H02J 7/14* (2013.01); *B60L 7/10* (2013.01); *H01M 2010/4271* (2013.01); *H01M 2220/20* (2013.01); *H01M 2300/0002* (2013.01); *H01M 2300/0068* (2013.01); *H01M 2300/0071* (2013.01); *H01M 2300/0091* (2013.01)

(56) References Cited

U.S. PATENT DOCUMENTS

| | | |
|---|---|---|
| 2008/0292968 A1 | 11/2008 | Lee et al. |
| 2011/0274950 A1 | 11/2011 | Whitacre |
| 2013/0244102 A1 | 9/2013 | Golodnitsky et al. |
| 2014/0011098 A1* | 1/2014 | Jeon .................. H01M 10/0525 |
| | | 429/332 |
| 2015/0086859 A1 | 3/2015 | Chang et al. |
| 2016/0226067 A1 | 8/2016 | Harada et al. |
| 2017/0110723 A1 | 4/2017 | Ishibashi et al. |
| 2017/0271682 A1 | 9/2017 | Matsuno et al. |
| 2017/0271717 A1 | 9/2017 | Yamashita et al. |
| 2017/0373351 A1 | 12/2017 | Kawai et al. |

FOREIGN PATENT DOCUMENTS

| | | |
|---|---|---|
| JP | 2000-77073 | 3/2000 |
| JP | 2001-200125 | 7/2001 |
| JP | 2001-206964 A | 7/2001 |
| JP | 2003-17057 | 1/2003 |
| JP | 2005-71807 | 3/2005 |
| JP | 2007-513464 A | 5/2007 |
| JP | 2010-56026 A | 3/2010 |
| JP | 2014-500597 | 1/2014 |
| JP | 2015-156356 A | 8/2015 |
| JP | 2016-146338 A | 8/2016 |
| JP | 2017-33895 A | 2/2017 |
| WO | WO 2012/063827 A1 | 5/2012 |
| WO | WO 2016/038682 A1 | 3/2016 |
| WO | WO 2016/114141 A1 | 7/2016 |
| WO | WO 2016/120266 A1 | 8/2016 |
| WO | WO 2017/135323 A1 | 8/2017 |

OTHER PUBLICATIONS

S. Liu et al., "Rechargeable Aqueous Lithium-ion Battery of $TiO_2$/$LiMn_2O_4$ with a High Voltage", Journal of The Electrochemical Society, 158(12) A1490-A1497 (2011).

U.S. Appl. No. 15/444,945, filed Feb. 28, 2017, Yasuyuki Hotta et al.

U.S. Appl. No. 15/697,709, filed Sep. 7, 2017, Norio Takami et al.

U.S. Appl. No. 15/701,888, filed Sep. 12, 2017, Kazuomi Yoshima et al.

* cited by examiner

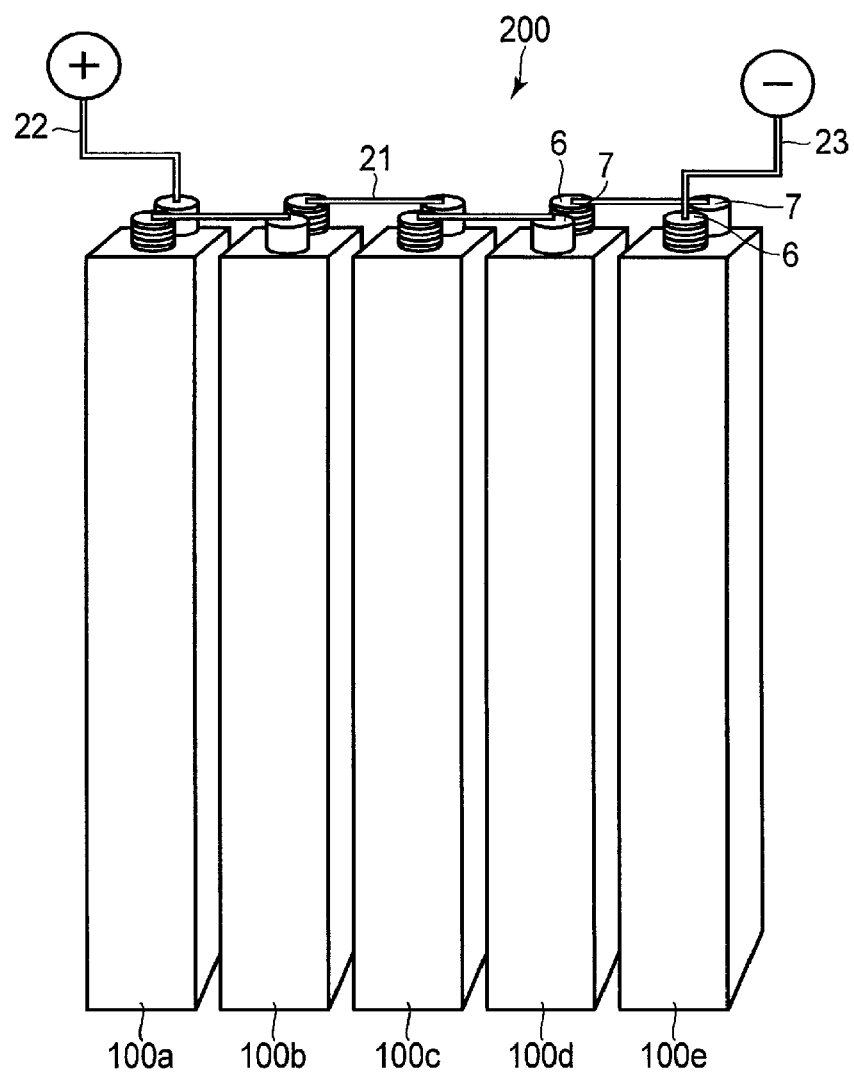
F I G. 6

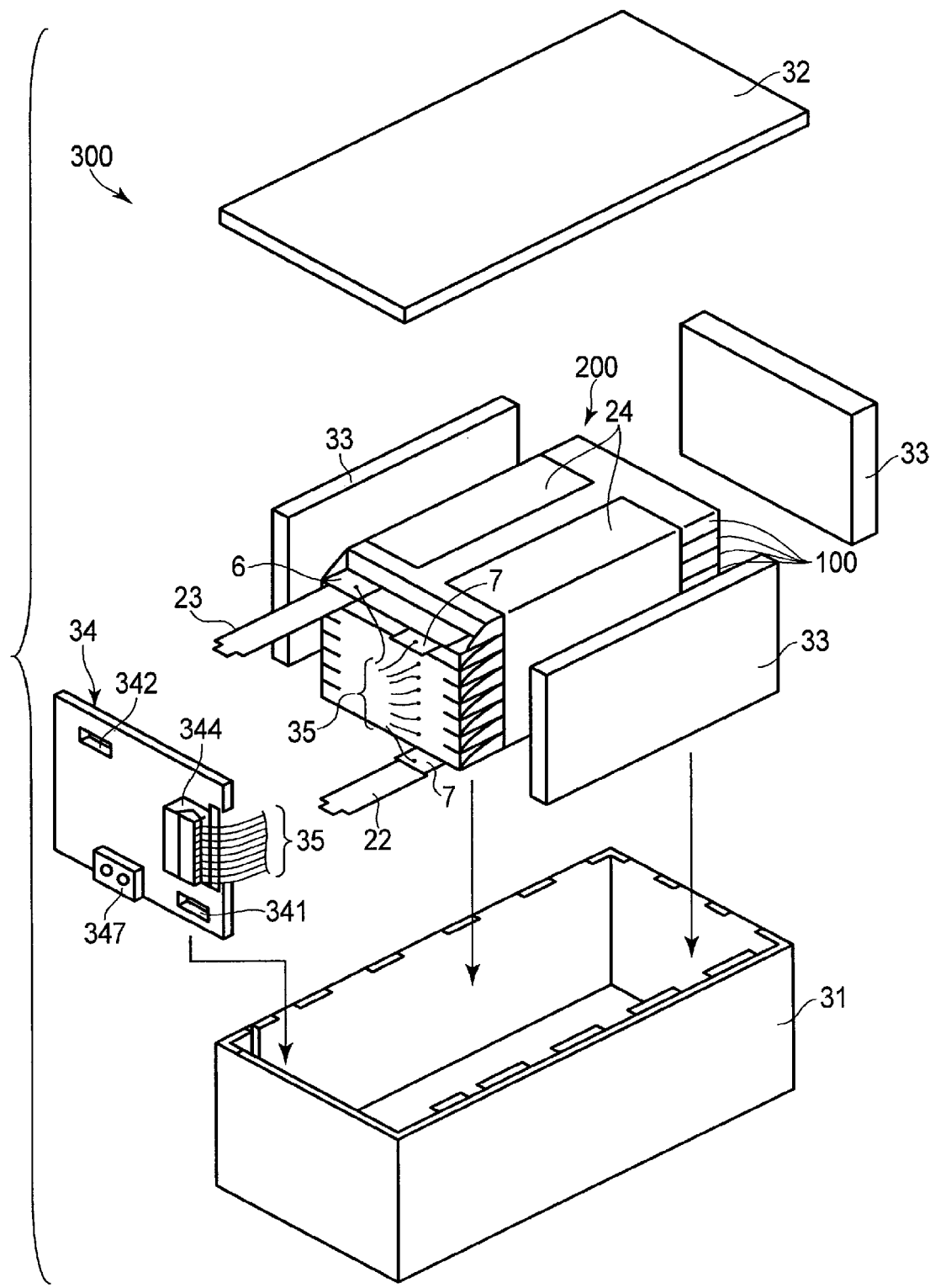
F I G. 7

SECONDARY BATTERY, BATTERY PACK, AND VEHICLE

CROSS-REFERENCE TO RELATED APPLICATIONS

This application is based upon and claims the benefit of priority from Japanese Patent Application No. 2017-179370, filed Sep. 19, 2017, the entire contents of which are incorporated herein by reference.

FIELD

Embodiments described herein relate generally to a secondary battery, a battery pack, and a vehicle.

BACKGROUND

A nonaqueous electrolyte battery such as a lithium ion secondary battery is used as a power supply in a broad field. The forms of nonaqueous electrolyte batteries include many different forms from small batteries for various kinds of electronic devices and the like to large batteries for electric vehicles and the like.

A nonaqueous electrolyte battery includes a negative electrode containing a negative electrode active material, a positive electrode containing a positive electrode active material, a separator, and a nonaqueous electrolyte. As the negative electrode active material, for example, a carbon material or a lithium titanium oxide is used. As the positive electrode active material, for example, a layered oxide containing nickel, cobalt, manganese, and the like is used. As the separator, for example, a porous film made of a resin or a nonwoven fabric is used.

As the nonaqueous electrolyte, a liquid nonaqueous electrolyte obtained by dissolving an electrolyte salt in a nonaqueous solvent can be used. As the nonaqueous solvent, for example, a mixture of ethylene carbonate and methyl ethyl carbonate or the like is used. The nonaqueous electrolyte has high oxidation resistance and high reduction resistance, and electrolysis of the solvent hardly occurs. For this reason, the nonaqueous electrolyte battery can implement a high electromotive force and excellent charge-and-discharge performance. However, since many nonaqueous solvents are combustible materials, the nonaqueous electrolyte battery needs various measures to improve safety.

Here, as the electrolyte, an aqueous electrolyte obtained by dissolving an electrolyte salt in an aqueous solvent is known. Examples of a battery using the aqueous electrolyte are a nickel/hydrogen battery and a lead storage battery. In general, the aqueous solvent does not have combustibility. Hence, when the aqueous electrolyte is used, a battery having high safety can be obtained as compared to a case in which a nonaqueous electrolyte is used.

However, water contained in the aqueous solvent has a narrow potential window, as compared to a nonaqueous solvent. The potential window is related to electrolysis of the solvent. For this reason, in the aqueous electrolyte battery, the potential range in which charge and discharge are executed needs to be limited to a potential range in which electrolysis of water does not occur. Hence, the aqueous electrolyte battery cannot easily obtain a sufficient energy density, and the charge-and-discharge efficiency is low, as compared to the nonaqueous electrolyte battery.

BRIEF DESCRIPTION OF THE DRAWINGS

FIG. 6 is a perspective view schematically showing an example of the battery module according to the second embodiment;

FIG. 7 is an exploded perspective view schematically showing an example of the battery pack according to the third embodiment;

DETAILED DESCRIPTION

Figure 1:
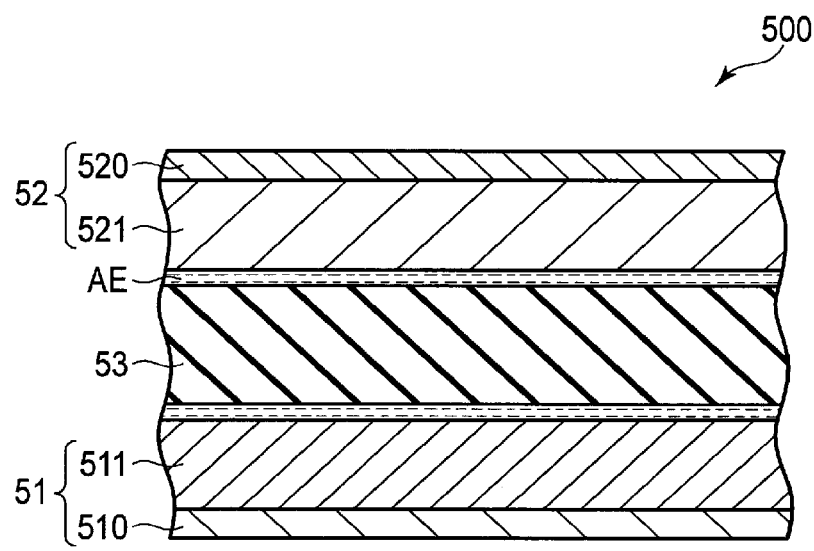
FIG. 1 is a sectional view schematically showing an example of the secondary battery according to the first embodiment.

According to one embodiment, a secondary battery is provided. The secondary battery includes a positive electrode, a negative electrode, separator, and an aqueous electrolyte. The positive electrode contains a positive electrode active material. The negative electrode contains a negative electrode active material. The separator is located at least between the positive electrode and the negative electrode. The separator includes a composite film. The composite film includes a mixture of a polymeric material and ion conductive solid electrolyte particles having alkali metal ions conductivity. The polymeric material includes a polymer comprising a monomer unit. The monomer unit is a hydrocarbon with a functional group including at least one element selected from the group consisting of oxygen (O), sulfur (S), nitrogen (N), and fluorine (F). A ratio of the polymer in the polymeric material is not less than 70 mol %.

According to another embodiment, a battery pack is provided. The battery pack includes the secondary battery according to the embodiment.

According to another embodiment, a vehicle is provided. The vehicle includes the battery pack according to the embodiment.

An embodiment of the present invention will now be described with reference to the accompanying drawings. Portions denoted by the same reference numerals are portions corresponding to each other. Note that the drawings are schematic or conceptual views, and the relationship between the thickness and the width of each portion, the size ratio between portions, and the like do not necessarily match the actuality. In addition, the same portions are sometimes shown in different sizes or ratios depending on the drawing.

First Embodiment

A secondary battery according to the first embodiment includes a positive electrode, a negative electrode, separator, and an aqueous electrolyte. The positive electrode contains a positive electrode active material. The negative electrode contains a negative electrode active material. The separator is located at least between the positive electrode and the negative electrode. The separator includes a composite film.

The composite film includes a mixture of a polymeric material and ion conductive solid electrolyte particles having alkali metal ions conductivity. The polymeric material includes a polymer comprising a monomer unit. The monomer unit is a hydrocarbon with a functional group including at least one element selected from the group consisting of oxygen (O), sulfur (S), nitrogen (N), and fluorine (F). A ratio of the polymer in the polymeric material is not less than 70 mol %.

The composite film containing the above-described polymeric material has resistance to permeation of an aqueous solvent and has excellent lithium ion conductivity.

In the secondary battery according to the first embodiment, water contained in the solvent of the aqueous electrolyte can be electrolyzed inside the negative electrode and near the negative electrode in the initial charge. That is, during the initial charge, lithium ions are inserted in the negative electrode active material, and the potential of the negative electrode thus lowers. If this potential becomes lower than the hydrogen generation potential, some water is decomposed into hydrogen ($H_2$) and hydroxide ions ($OH^-$) inside the negative electrode and near the negative electrode. Accordingly, pH of the aqueous electrolyte existing inside the negative electrode and near the negative electrode rises.

Here, the hydrogen generation potential of the negative electrode depends on the pH of the aqueous electrolyte. That is, when the pH of the aqueous electrolyte which is in contact with the negative electrode becomes high, the hydrogen generation potential of the negative electrode lowers. Hence, after the initial charge, decomposition of water in the negative electrode becomes hard to occur.

The separator has a characteristic to pass lithium ions but hardly pass the aqueous solvent. Since this separator is located at least between the negative electrode and the positive electrode, the solvent contained in the aqueous electrolyte in contact with the negative electrode and the solvent contained in the aqueous electrolyte in contact with the positive electrode hardly mix with each other. Hence, the water in the positive electrode side hardly enters the negative electrode side. In addition, hydroxide ions generated on the negative electrode side hardly move to the positive electrode side. For this reason, when the separator is used, the pH of the aqueous electrolyte in contact with the negative electrode can be kept high.

For the above-described reason, in the secondary battery according to the first embodiment, even if charge and discharge are repeated, decomposition of water hardly progresses, and a high charge-and-discharge efficiency can be maintained. Hence, this battery can implement high storage performance, cycle life performance, and safety.

FIG. 1 is a sectional view schematically showing an example of the secondary battery according to the first embodiment. As shown in FIG. 1, a secondary battery 500 shown in FIG. 1 includes a negative electrode 51, a positive electrode 52, a separator 53, and an aqueous electrolyte AE. The secondary battery 500 shown in FIG. 1 is a lithium ion secondary battery. The lithium ion secondary battery will be described here as an example. However, the type of alkali metal ions that the negative electrode and the positive electrode can insert and extract is not particularly limited. As alkali metal ions other than lithium ions, for example, sodium ions can be used.

The negative electrode 51 includes a negative electrode current collector 510 and a negative electrode active material-containing layer 511. The negative electrode active material-containing layer 510 is supported on one main surface of the negative electrode current collector 510. The positive electrode 52 includes a positive electrode current collector 520 and a positive electrode active material-containing layer 521. The positive electrode active material-containing layer 521 is supported on one main surface of the positive electrode current collector 520.

The separator 53 is located between the negative electrode active material-containing layer 511 and the positive electrode active material-containing layer 521. The separator 53 partitions the interior of the secondary battery 500 into the side of the negative electrode 51 where the negative electrode 51 is located and the side of the positive electrode 52 where the positive electrode 52 is located.

The aqueous electrolyte AE exists in a space located between the negative electrode current collector 510 and the positive electrode current collector 520. Examples of the space include holes in the negative electrode active material containing layer 511 and the positive electrode active material containing layer 521, the interfaces between the negative electrode active material-containing layer 511 and the positive electrode active material-containing layer 521 and the separator 53, and gaps in the separator 53. The aqueous electrolyte AE is an aqueous solution containing an aqueous solvent and an electrolyte salt dissolved in the aqueous solvent.

Details of the negative electrode, the positive electrode, the separator, the aqueous electrolyte, and a container will be described below.

1) Negative Electrode

As the material of the negative electrode current collector, a substance that is electrochemically stable in the negative electrode potential range when the alkali metal ions are inserted or extracted is used. The negative electrode current collector is preferably, for example, an aluminum foil or an aluminum alloy foil containing at least one element selected from the group consisting of magnesium (Mg), titanium (Ti), zinc (Zn), manganese (Mn) iron (Fe), copper (Cu), and silicon (Si). The negative electrode current collector may have another form such as a porous body or a mesh. The thickness of the negative electrode current collector is preferably 5 μm o 20 μm. A current collector having such a thickness can balance the strength of the electrode and weight reduction.

The negative electrode active material-containing layer may be supported on each main surface of the negative electrode current collector.

The porosity of the negative electrode active material-containing layer is preferably set to 20% to 50%. This makes it possible to obtain a negative electrode having good affinity for the aqueous electrolyte and having a high density. The porosity of the negative electrode active material-containing layer is more preferably 25% to 40%.

The porosity of the negative electrode active material-containing layer can be obtained by, for example, mercury porosimetry. More specifically, first, the pore distribution of the active material-containing layer is obtained by mercury porosimetry. Next, the total pore amount is calculated from the pore distribution. Next, the porosity can be calculated from the ratio of the total pore amount and the volume of the active material-containing layer.

The specific surface area of the negative electrode active material-containing layer in the BET method by nitrogen ($N_2$) adsorption is more preferably 3 $m^2/g$ to 50 $m^2/g$. If the specific surface area of the negative electrode active material-containing layer is less than 3 $m^2/g$, the affinity between the negative electrode active material and the aqueous electrolyte lowers. As a result, the interface resistance of the negative electrode increases, and the output characteristic and the charge-and-discharge cycle characteristic may lower. On the other hand, if the specific surface area of the negative electrode active material-containing layer exceeds 50 m²/g, an ionic species ionized from the electrolyte salt may be unevenly distributed on the negative electrode side, resulting in a shortage of an ionic species ionized from the electrolyte salt in the positive electrode. Hence, the output characteristic and the charge-and-discharge cycle characteristic may lower.

The specific surface area can be obtained by, for example, the following method. First, the secondary battery is disassembled, and a part of the negative electrode active material containing layer is extracted. Next, the nitrogen gas adsorption amount (mL/g) of the sample is measured at each pressure P while a nitrogen gas pressure P (mmHg) is gradually increased in nitrogen gas at 77 K (boiling point of nitrogen). Then, an adsorption isotherm is obtained by plotting the adsorption amount of nitrogen gas with respect to each relative pressure $P/P_0$. The relative pressure $P/P_0$ is obtained by dividing the pressure P (mmHg) by a saturated vapor pressure $P_0$ (mmHg) of nitrogen gas. Then, a BET plot is calculated from the nitrogen adsorption isotherm and the BET equation, and a specific surface area is obtained using the BET plot. For the calculation of the BET plot, a BET multipoint method is used.

As the negative electrode active material, a compound whose lithium ion insertion/extraction potential is 1 V (vs. Li/Li$^+$) to 3 V (vs. Li/Li$^+$) as a potential based on metal lithium can be used. That is, the secondary battery according to the first embodiment can maintain the hydrogen generation potential of the negative electrode in a low state after the initial charge, as described above. Hence, a material whose lithium ion insertion/extraction potential has a relatively small lower limit value can be used as the negative electrode active material of the secondary battery. When such a negative electrode active material is used, the energy density of the secondary battery can be raised. For this reason, the secondary battery can implement the same energy density as that of a battery using a nonaqueous electrolyte.

As the negative electrode active material, more specifically, a titanium oxide or a titanium-containing oxide can be used. As the titanium-containing oxide, a lithium titanium composite oxide, a niobium titanium composite oxide, a sodium niobium titanium composite oxide and the like can be used. One type or two or more types of the titanium oxide and the titanium-containing oxide can be included in the negative electrode active material.

The titanium oxide includes, for example, a titanium oxide having a monoclinic structure, a titanium oxide having a rutile structure, and a titanium oxide having an anatase structure. For titanium oxides of these crystal structures, the composition before charge can be expressed as $TiO_2$, and the composition after charge can be expressed as $Li_xTiO_2$ ($0 \leq x \leq 1$). In addition, the structure of titanium oxide having a monoclinic structure before charge can be expressed as $TiO_2(B)$.

The lithium titanium composite oxide includes, for example, a lithium titanium composite oxide having a spinel structure (for example, the general formula is $Li_{4+x}Ti_5O_{12}$ ($-1 \leq x \leq 3$)), a lithium titanium composite oxide having a ramsdellite structure (for example, $Li_{2+x}Ti_3O_7$ ($-1 \leq x \leq 3$)), $Li_{1+x}Ti_2O_4$ ($0 \leq x \leq 1$), $Li_{1.1+x}Ti_{1.8}O_4$ ($0 \leq x \leq 1$), $Li_{1.07+x}Ti_{1.86}O_4$ ($0 \leq x \leq 1$), and $Li_xTiO_2$ ($0 < x \leq 1$), and the like. The lithium titanium composite oxide may be a lithium titanium composite oxide in which a dopant is introduced.

The niobium titanium composite oxides include, for example, a material expressed as $Li_aTiM_bNb_{2\pm\beta}O_{7\pm\sigma}$ ($0 \leq a \leq 5$, $0 \leq b \leq 0.3$, $0 \leq \beta \leq 0.3$, $0 \leq \sigma \leq 0.3$, M is at least one element selected from the group consisting of Fe, V, Mo, and Ta).

The sodium niobium titanium oxides include, for example, an orthorhombic Na-containing niobium titanium composite oxide represented by the general formula $Li_{2+v}Na_{2-w}M1_xTi_{6-y-z}Nb_yM2_zO_{14+\delta}$ ($0 \leq v \leq 4$, $0 \leq w < 2$, $0 \leq x < 2$, $0 < y < 6$, $0 \leq z < 3$, $-0.5 \leq \delta \leq 0.5$, M1 includes at least one element selected from the group consisting of Cs, K, Sr, Ba, and Ca, and M2 includes at least one element selected from the group consisting of Zr, Sn, V, Ta, Mo, W, Fe, Co, Mn, and Al).

As the negative electrode active material, the titanium oxide having the anatase structure, the titanium oxide having the monoclinic structure, the lithium titanium composite oxide having the spinel structure, or a mixture thereof is preferably used. When one of these oxides is used as the negative electrode active material and a lithium manganese oxide is used as the positive electrode active material, a high electromotive force can be obtained.

The negative electrode active material is contained in the negative electrode active material-containing layer in a form of, for example, particles. The negative electrode active material particles can be primary particles, secondary particles as the aggregates of primary particles, or a mixture of single primary particles and secondary particles. The shape of a particle is not particularly limited and can be, for example, spherical, elliptical, flat, or fibrous.

The secondary particles of the negative electrode active material can be obtained by, for example, the following method. First, the raw materials of the active material are reactively synthesized to produce an active material precursor having an average particle size of 1 µm or less. After that, a calcination treatment is performed for the active material precursor, and a grinding treatment is performed using a grinder such as a ball mill or a jet mill. Next, in a calcination treatment, the active material precursor is agglomerated to grow secondary particles with a larger particle size.

The average particle size (diameter) of the secondary particles of the negative electrode active material is preferably 3 µm or more, and more preferably 5 µm to 20 µm. Within this range, since the surface area of the active material is small, decomposition of water can further be suppressed.

The average particle size of the primary particles of the negative electrode active material is preferably 1 µm or less. This shortens the diffusion distance of Li ions in the active material and increases the specific surface area. For this reason, excellent high input performance (rapid charge) can be obtained. On the other hand, if the average particle size of the primary particles of the negative electrode active material is small, agglomeration of the particles readily occurs. If agglomeration of the particles of the negative electrode active material occurs, the aqueous electrolyte is readily unevenly distributed on the negative electrode side in the secondary battery, and the ionic species may be exhausted in the positive electrode. For this reason, the average particle size of the primary particles of the negative electrode active material is preferably 0.001 µm or more. The average particle size of the primary particles of the negative electrode active material is more preferably 0.1 µm to 0.8 µm.

Note that each of the primary particle size and the secondary particle size means a particle size with which a volume integrated value becomes 50% in a particle size distribution obtained by a laser diffraction particle size distribution measuring apparatus. As a sample used when performing the particle size distribution measurement, a dispersion obtained by diluting the negative electrode active material particles by N-methyl-2-pyrrolidone such that the concentration becomes 0.1 mass % to 1 mass % is used.

The specific surface area of the negative electrode active material in the BET method by nitrogen ($N_2$) adsorption falls within the range of, for example, 3 $m^2$/g to 200 $m^2$/g. If the specific surface area of the negative electrode active material falls within this range, the affinity between the negative electrode and the aqueous electrolyte can be made higher. The specific surface area can be obtained by, for example, the same method as that for the specific surface area of the negative electrode active material containing layer.

The negative electrode active material-containing layer may contain a conductive agent, a binder, and the like in addition to the negative electrode active material.

The conductive agent is mixed as needed to raise current collection performance and suppress the contact resistance between the active material and the current collector. Examples of the conductive agent include carbonaceous materials such as acetylene black, Ketjen black, graphite, and coke. The conductive agent may be of one type, or two or more types may be used in mixture.

The binder has a function of binding the active material, the conductive agent, and the current collector. As the binder, at least one material selected from the group consisting of, for example, a cellulose-based polymer such as polytetrafluoroethylene (PTFE), polyvinylidene fluoride (PVdF), or carboxymethylcellulose (CMC), fluorine-based rubber, styrene-butadiene rubber, an acrylic resin or a copolymer thereof, polyacrylic acid, and polyacrylonitrile can be used. The binder is not limited to these materials. The binder may be of one type, or two or more types may be used in mixture.

The mixing ratios of the negative electrode active material, the conductive agent, and the binder in the negative electrode active material-containing layer are preferably 70 mass % to 95 mass %, 3 mass % to 20 mass %, and 2 mass % to 10 mass %, respectively. If the mixing ratio of the conductive agent is 3 mass % or more, the conductivity of the negative electrode can be improved. If the mixing ratio of the conductive agent is 20 mass % or less, decomposition of the aqueous electrolyte on the conductive agent surface can be reduced. If the mixing ratio of the binder is 2 mass % or more, a sufficient electrode strength can be obtained. If the mixing ratio of the binder is 10 mass % or less, the insulating portion of the electrode can be decreased.

The negative electrode can be obtained by, for example, the following method. First, the active material, the conductive agent, and the binder are suspended in an appropriate solvent to prepare a slurry. Next, the slurry is applied to one surface or both surfaces of the current collector. The coating on the current collector is dried, thereby forming an active material-containing layer. After that, pressing is performed for the current collector and the active material-containing layer formed on it. As the active material-containing layer, the mixture of the active material, the conductive agent, and the binder formed into pellets may be used.

2) Positive Electrode

The positive electrode current collector is made of, for example, a metal such as stainless steel, aluminum (Al), or titanium (Ti). The positive electrode current collector has a form of, for example, a foil, a porous body, or a mesh. To prevent corrosion by the reaction between the positive electrode current collector and the aqueous electrolyte, the surface of the positive electrode current collector may be covered with a different kind of element. The positive electrode current collector is preferably made of a material with excellent corrosion resistance and oxidation resistance, for example, a Ti foil. Note that when $Li_2SO_4$ is used as the aqueous electrolyte, Al may be used as the positive electrode current collector because corrosion does not progress.

As the positive electrode active material, a compound whose lithium ion insertion/extraction potential is 2.7 V (vs. Li/Li$^+$) to 5.5 V (vs. Li/Li$^+$) as a potential based on metal lithium can be used. The positive electrode may contain one type of positive electrode active material or may contain two or more types of positive electrode active materials.

Examples of the positive electrode active material include a lithium manganese composite oxide, a lithium nickel composite oxide, a lithium cobalt aluminum composite oxide, a lithium nickel cobalt manganese composite oxide, a spinel type lithium manganese nickel composite oxide, a lithium manganese cobalt composite oxide, a lithium iron oxide, a lithium fluorinated iron sulfate, a phosphate compound having an olivine crystal structure (for example, $Li_xFePO_4$ (0<x≤1), $Li_xMnPO_4$ (0<x≤1)), and the like. The phosphate compound having an olivine crystal structure has excellent thermal stability.

Examples of the positive electrode active material capable of obtaining a high positive electrode potential are a lithium manganese composite oxide having a spinel structure such as $Li_xMn_2O_4$ (0<x≤1) or $Li_xMnO_2$ (0<x≤1), a lithium nickel aluminum composite oxide such as $Li_xNi_{1-y}Al_yO_2$ (0<x≤1, and 0<y<1), a lithium cobalt composite oxide such as $Li_xCoO_2$ (0<x≤1), a lithium nickel cobalt composite oxide such as $Li_xNi_{1-y-z}Co_yMn_zO_2$ (0<x≤1, 0<y<1, and 0≤z<1), a lithium manganese cobalt composite oxide such as $Li_xMn_yCo_{1-y}O_2$ (0<x≤1, and 0<y<1), a spinel type lithium manganese nickel composite oxide such as $Li_xMn_{1-y}Ni_yO_4$ (0<x≤1, 0<y<2, and 0<1-y<1), a lithium phosphorus oxide such as having an olivine structure such as $Li_xFePO_4$ (0<x≤1), $Li_xFe_{1-y}Mn_yPO_4$ (0<x≤1, 0≤y≤1), or $Li_xCoPO_4$ (0<x≤1), and a fluorinated iron sulfate (for example, $Li_xFeSO_4F$ (0<x≤1)).

The positive electrode active material is preferably at least one material selected from the group consisting of a lithium cobalt composite oxide, a lithium manganese composite oxide, and a lithium phosphorus oxide having an olivine structure. The operating potentials of these active materials are 3.5 V (vs. Li/Li$^+$) to 4.2 V (vs. Li/Li$^+$). That is, the operating potentials of these active materials are relatively high. When these positive electrode active materials are used in combination with the above-described negative electrode active material such as a spinel type lithium titanate or an anatase type titanium oxide, a high battery voltage can be obtained.

The positive electrode active material is contained in the positive electrode in a form of, for example, particles. The positive electrode active material particles can be single primary particles, secondary particles as the aggregates of primary particles, or a mixture of primary particles and secondary particles. The shape of a particle is not particularly limited and can be, for example, spherical, elliptical, flat, or fibrous.

The average particle size (diameter) of the primary particles of the positive electrode active material is preferably 10 μm or less, and more preferably 0.1 μm to 5 μm. The average particle size (diameter) of the secondary particles of the positive electrode active material is preferably 100 μm or less, and more preferably 10 μm to 50 μm.

The primary particle size and the secondary particle size of the positive electrode active material can be measured by the same method as that for the negative electrode active material particles.

The positive electrode active material-containing layer may contain a conductive agent, a binder, and the like in addition to the positive electrode active material.

The conductive agent is mixed as needed to raise current collection performance and suppress the contact resistance between the active material and the current collector. Examples of the conductive agent include carbonaceous materials such as acetylene black, Ketjen black, graphite, and coke. The conductive agent may be of one type, or two or more types may be used in mixture.

As the binder, for example, polytetrafluoroethylene (PTFE), polyvinylidene fluoride (PVdF), fluorine-based rubber, ethylene-butadiene rubber, polypropylene (PP), polyethylene (PE), carboxymethylcellulose (CMC), polyimide (PI), polyacrylimide (PAI), or the like can be used. The binder may be of one type, or two or more types may be used in mixture.

The mixing ratios of the positive electrode active material, the conductive agent, and the binder in the positive electrode active material-containing layer are preferably 70 mass % to 95 mass %, 3 mass % to 20 mass %, and 2 mass % to 10 mass %, respectively. If the mixing ratio of the conductive agent is 3 mass % or more, the conductivity of the positive electrode can be improved. If the mixing ratio of the conductive agent is 20 mass % or less, decomposition of the aqueous electrolyte on the conductive agent surface can be reduced. If the mixing ratio of the binder is 2 mass % or more, a sufficient electrode strength can be obtained. If the mixing ratio of the binder is 10 mass % or less, the insulating portion of the electrode can be decreased.

The positive electrode can be obtained by, for example, the following method. First, the active material, the conductive agent, and the binder are suspended in an appropriate solvent to prepare a slurry. Next, the slurry is applied to one surface or both surfaces of the current collector. The coating on the current collector is dried, thereby forming an active material-containing layer. After that, pressing is performed for the current collector and the active material-containing layer formed on it. As the active material-containing layer, the mixture of the active material, the conductive agent, and the binder formed into pellets may be used.

3) Separator

The separator prevents the negative electrode and the positive electrode from coming into contact. The separator is located at least between the positive electrode and the negative electrode. The separator is preferably in contact with the negative electrode, and more preferably in contact with both the positive electrode and the negative electrode. The separator is preferably located to cover the main surface of the negative electrode. In addition, the separator preferably covers at least one side surface as well in addition to the main surface of the negative electrode. When such an arrangement is employed, in the secondary battery, the negative electrode side and the positive electrode side can be more correctly spaced apart, and electrolysis of water can further be suppressed. Note that the secondary battery according to the first embodiment may include a plurality of separators. In this case, the negative electrode and the positive electrode can be located between the separators.

The separator is a sheet-shaped film having electrical insulating properties. The separator can pass a monovalent cation. Examples of the monovalent cation are alkali metal ions such as a lithium ion and a sodium ion. On the other hand, the separator hardly passes a cation and an anion of bivalence or more valence. The separator preferably selectively passes the monovalent cation.

The separator hardly passes the solvent of the aqueous electrolyte. That is, it is preferable that solvated alkali metal ions can enter the separator, but the solvated alkali metal ions cannot pass through the separator. In the separator, the solvated alkali metal ions can be desolvated.

The separator includes a composite film containing a mixture of solid electrolyte particles and a polymeric material. The separator may be a composite film made of a mixture of solid electrolyte particles and a polymeric material. In the composite film, the solid electrolyte particles and the polymeric material preferably exist in a mixed state.

The solid electrolyte particles have ionic conductivity of alkali metal ions. The solid electrolyte particles are preferably excellent in lithium ion conductivity. The solid electrolyte particles preferably have high waterproofness.

The solid electrolyte particles are preferably the main component of the composite film. From the viewpoint of increasing the denseness of the composite film, the ratio of the solid electrolyte particles in the composite film is preferably 50 mass % or more, more preferably 60 mass % or more, and much more preferably 75 mass % or more.

From the viewpoint of increasing the flexibility of the composite film, the ratio of the solid electrolyte particles in the composite film is preferably 98 mass % or less, more preferably 94 mass % or less, and much more preferably 92 mass % or less.

The shape of a solid electrolyte particle is not particularly limited and can be, for example, spherical, elliptical, flat, or fibrous. From the viewpoint of improving the alkali metal ion conductivity, the average particle size of the solid electrolyte particles is preferably 100 μm or less, more preferably 70 μm or less, and much more preferably 50 μm or less. The average particle size of the solid electrolyte particles do not particularly have a lower limit value. For example, the lower limit value of the average particle size is 0.05 μm or more.

Note that average particle size of the solid electrolyte particles means a particle size with which a volume integrated value becomes 50% in a particle size distribution obtained by a laser diffraction particle size distribution measuring apparatus. As a sample used when performing the particle size distribution measurement, a dispersion obtained by diluting the solid electrolyte particles by ethanol such that the concentration becomes 0.01 mass % to 5 mass % is used.

As the solid electrolyte particles, an inorganic solid electrolyte is preferably used. As the inorganic solid electrolyte, for example, an oxide-based solid electrolyte or a sulfide-based solid electrolyte can be used. As the oxide-based solid electrolyte, a lithium phosphate solid electrolyte having a NASICON structure and represented by a general formula $LiM_2(PO_4)_3$ is preferably used. M in the formula is preferably at least one element selected from the group consisting of titanium (Ti), germanium (Ge), strontium (Sr), zirconium (Zr), tin (Sn), and aluminum (Al). The element M preferably includes Al and one of Ge, Zr, and Ti.

Detailed examples of the lithium phosphate solid electrolyte having the NASICON structure include LATP $(Li_{1+x}Al_xTi_{2-x}(PO_4)_3)$, $Li_{1+x}Al_xGe_{2-x}(PO_4)_3$, and $Li_{1+x}Al_xZr_{2-x}(PO_4)_3$. In the above formula, x falls within the range of $0<x\leq5$. As the solid electrolyte, LATP is preferably used. LATP is excellent in waterproofness and hardly causes hydrolysis in the secondary battery.

As the oxide-based solid electrolyte, LIPON $(Li_{2.9}PO_{3.3}N_{0.46})$ in an amorphous state or LLZ ($Li_7La_3Zr_2O_{12}$) having a garnet structure may be used. The solid electrolyte may be of one type, or two or more types may be used in mixture.

As the solid electrolyte particles, a sodium containing solid electrolyte may be used. The sodium containing solid electrolyte is excellent in the ionic conductivity of sodium ions. As the sodium containing solid electrolyte, β-alumina, a sodium phosphorus sulfide, a sodium phosphorus oxide, or the like can be used. The sodium ions containing solid electrolyte preferably has a glass-ceramic form.

The polymeric material can exist in gaps among the solid electrolyte particles. The polymeric material improves the binding properties of the solid electrolyte particles.

The weight-average molecular weight of the polymeric material is, for example, 3,000 or more. When the weight-average molecular weight of the polymeric material is 3,000 or more, the binding properties of the solid electrolyte particles can further be improved. The weight-average molecular weight of the polymeric material is preferably 3,000 to 5,000,000, more preferably 5,000 to 2,000,000, and much more preferably 10,000 to 1,000,000. The weight-average molecular weight of the polymeric material can be obtained by gel permeation chromatography (GPC).

From the viewpoint of increasing the flexibility of the composite film, the ratio of the polymeric material in the composite film is preferably 1 mass % or more, more preferably 3 mass % or more, and much more preferably 10 mass % or more.

In addition, from the viewpoint of increasing the lithium ion conductivity of the composite film, the ratio of the polymeric material in the composite film is preferably 20 mass % or less, and more preferably 10 mass % or less.

The polymeric material can be a polymer made of a single monomer unit, a copolymer made of a plurality of monomer units, or a mixture thereof. The polymeric material contains a monomer unit constituted by a hydrocarbon with a functional group including one type or two or more types of elements selected from the group consisting of oxygen (O), sulfur (S), nitrogen (N), and fluorine (F). In the polymeric material, the ratio of a portion formed from the monomer unit is 70 mol % or more. The monomer unit will be referred to as a first monomer unit hereinafter. Additionally, in a copolymer, a monomer unit other than the first monomer unit will be referred to as a second monomer unit. The copolymer of the first monomer unit and the second monomer unit may be an alternating copolymer, a random copolymer, or a block copolymer.

If the ratio of the portion formed from the first monomer unit in the polymeric material is lower than 70 mol %, the composite film may readily pass water, and as a result, the charge-and-discharge efficiency of the battery may lower. The ratio of the portion formed from the first monomer unit in the polymeric material is preferably 90 mol % or more. More preferably, the ratio of the portion formed from the first monomer unit in the polymeric material is preferably 100 mol %, that is, the copolymer is a copolymer formed from only the first monomer unit.

The first monomer unit may be a compound whose side chain has a functional group including one type or two or more types of elements selected from the group consisting of oxygen (O), sulfur (S), nitrogen (N), and fluorine (F) and whose main chain is formed from a carbon-to-carbon bond. The hydrocarbon may have one type or two or more types of functional groups each including one type or two or more types of elements selected from the group consisting of oxygen (O), sulfur (S), nitrogen (N), and fluorine (F). The functional group in the first monomer unit raises the conductivity of the alkali metal ions that pass through the composite film.

The hydrocarbon that forms the first monomer unit preferably has a functional group including at least one element selected from the group consisting of oxygen (O), sulfur (S), and nitrogen (N). When the first monomer unit has such a functional group, the conductivity of the alkali metal ions in the composite film tends to further rise so as to lower the internal resistance.

The functional group contained in the first monomer unit is preferably at least one functional group selected from the group consisting of a formal group, a butyral group, a carbonylmethyl ester group, an acetyl group, a carbonyl group, a hydroxy group, and a fluoro group. In addition, the first monomer unit preferably contains at least one of a carbonyl group and a hydroxy group in a functional group, and more preferably contains both of them.

The first monomer unit can be represented by the following formula.

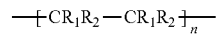

In the formula, $R_1$ is preferably selected for the group consisting of hydrogen (H), an alkyl group, and an amino group. In addition, $R_2$ is preferably selected from the group consisting of a hydroxy group (—OH), —$OR_1$, —$COOR_1$, —$OCOR_1$, —$OCH(R_1)O$—, —CN, —$N(R_1)_3$, and —$SO_2R_1$.

As the first monomer unit, at least one type or two or more types of monomer units selected from, for example, the group consisting of vinyl formal, vinyl alcohol, vinyl acetate, vinyl acetal, vinyl butyral, acrylic acid and a derivative thereof, methacrylic acid and a derivative thereof, acrylonitrile, acrylamide and a derivative thereof, styrene-sulfonic acid, and tetrafluoroethylene can be used.

The polymeric material preferably contains at least one material selected from the group consisting of polyvinyl formal, polyvinyl alcohol, polyvinyl acetal, polyvinyl butyral, polymethyl methacrylate, and polytetrafluoroethylene.

Examples of structural formulas of compounds usable as the polymeric material will be described below.

The structural formula of polyvinyl formal is as follows. In the formula, preferably, a is 50 to 80, b is 0 to 5, and c is 15 to 50.

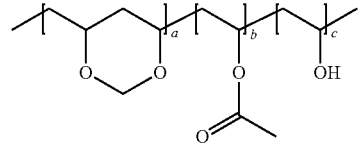

The structural formula of polyvinyl butyral is as follows. In the formula, preferably, l is 50 to 80, m is 0 to 10, and n is 10 to 50.

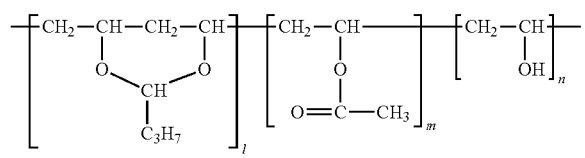

The structural formula of polyvinyl alcohol is as follows. In the formula, preferably, n is 70 to 20,000.

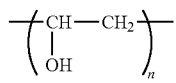

The structural formula of polymethyl methacrylate is as follows. In the formula, preferably, n is 30 to 10,000.

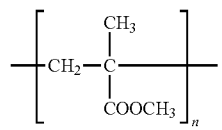

The second monomer unit is a compound other than the first monomer unit, that is, a hydrocarbon that does not have a functional group including one type or two or more types of elements selected from the group consisting of oxygen (O), sulfur (S), nitrogen (N), and fluorine (F), or a material that has the functional group but is not a hydrocarbon. Examples of the second monomer unit are ethylene oxide and styrene can be used. Examples of a polymer formed from the second monomer unit are polyethylene oxide (PEO) and polystyrene (PS).

The types of the functional groups contained in the first monomer unit and the second monomer unit can be identified by infrared spectroscopy (Fourier Transform Infrared Spectroscopy: FT-IR). Whether the first monomer unit is formed from a hydrocarbon can be determined by nuclear magnetic resonance (NMR). In the copolymer of the first monomer unit and the second monomer unit, the ratio of the portion formed from the first monomer unit can be calculated by NMR.

The polymeric material can contain an aqueous electrolyte. The ratio of the aqueous electrolyte that the polymeric material may contain can be grasped based on the water absorption capacity. Here, the water absorption capacity of the polymeric material is given by ([M1−M]/M×100) that is a value obtained by dividing a value obtained by subtracting a mass M of the polymeric material before immersion from a mass M1 of the polymeric material after it is immersed in water at a temperature of 23° C. for 24 hrs by the mass M of the polymeric material before immersion. The water absorption capacity of the polymeric material is considered to be associated with the polarity of the polymeric material.

When a polymeric material with a high water absorption capacity is used, the alkali metal ion conductivity of the composite film tends to rise. In addition, when a polymeric material having a high water absorption capacity is used, the binding force between the solid electrolyte particles and the polymeric material increase, and therefore, the flexibility of the composite film can be raised. The water absorption capacity of the polymeric material is preferably 0.01% or more, more preferably 0.5% or more, and much more preferably 2% or more.

When a polymeric material with a low water absorption capacity is used, the strength of the composite film can be increased. That is, if the water absorption capacity of the polymeric material is too high, the composite film may be swelled by the aqueous electrolyte. In addition, if the water absorption capacity of the polymeric material is too high, the polymeric material in the composite film may flow out into the aqueous electrolyte. The water absorption capacity of the polymeric material is preferably 15% or less, more preferably 10% or less, much more preferably 7% or less, and particularly preferably 3% or less.

The composite film may contain a plasticizing agent or an electrolyte salt in addition to the solid electrolyte particles and the polymeric material. For example, if the composite film contains an electrolyte salt, the alkali metal ion conductivity of the separator can further be raised.

Whether the composite film contains an electrolyte salt can be confirmed, for example, based on an alkali metal ion distribution obtained by energy dispersive X-ray spectrometry (EDX) for a section of the composite film. That is, if the composite film is made of a material that does not contain an electrolyte salt, the alkali metal ions remain in the surface layer of the polymeric material in the composite film, and therefore, rarely exist inside the composite film. Hence, a concentration gradient representing that the concentration of alkali metal ions is high in the surface layer of the composite film, and the concentration of alkali metal ions is low inside the composite film can be observed. On the other hand, if the composite film is made of a material containing an electrolyte salt, it can be confirmed that the alkali metal ions evenly exist inside the composite film as well.

On the other hand, if the electrolyte salt contained in the composite film and the electrolyte salt contained in the aqueous electrolyte are of different types, it can be found based on the difference of existing ions that the composite film contains an electrolyte salt different from that in the aqueous electrolyte. For example, when lithium chloride (LiCl) is used as the aqueous electrolyte, and LiTFSI (lithium bis(fluorosulfonyl)imide) is used as the composite film, the existence of (fluorosulfonyl)imide ions can be confirmed in the composite film. On the other hand, in the aqueous electrolyte on the negative electrode side, the existence of the (fluorosulfonyl)imide ions cannot be confirmed, or the (fluorosulfonyl)imide ions exist at a very low concentration.

As the electrolyte salt, a lithium salt, a sodium salt, or a mixture thereof is preferably used. One type or two or more types of electrolyte salts can be used.

As the lithium salt, for example, lithium chloride (LiCl), lithium bromide (LiBr), lithium hydroxide (LiOH), lithium sulfate ($Li_2SO_4$), lithium nitrate ($LiNO_3$), lithium acetate ($CH_3COOLi$), lithium oxalate ($Li_2C_2O_4$), lithium carbonate ($Li_2CO_3$), lithium bis(trifluoromethanesulfonyl)imide (LiTFSI: $LiN(SO_2CF_3)_2$), lithium bis(fluorosulfonyl)imide (LiFSI: $LiN(SO_2F)_2$), lithium bis(oxalate)borate (LiBOB: $LiB[(OCO)_2]_2$), or the like can be used.

As the sodium salt, for example, sodium chloride (NaCl), sodium sulfate ($Na_2SO_4$), sodium hydroxide (NaOH), sodium nitrate ($NaNO_3$), sodium trifluoromethanesulfonyl amide (NaTFSA), or the like can be used.

The composite film is preferably a dense film. If the denseness of the composite film is high, it tends to become hard to pass the solvent of the aqueous electrolyte. As the index of the denseness of the composite film, a density can be used. That is, when the density of the composite film is high, it becomes hard to pass the solvent of the aqueous electrolyte. The density of the composite film is preferably almost the same as the density calculated from the volume fraction of the density of each composition that forms the composite film. That is, a ratio D1/D2 of a density D1 of the composite film and a density D2 obtained from the volume fraction of each composition that forms the composite film is preferably 0.8 or more, and more preferably 1.

When LATP ($Li_{1+x}Al_xTi_{2-x}(PO_4)_3$) particles are used as the solid electrolyte particles, the density of the composite film is, for example, 2.4 g/cm$^3$ or more, and according to another example, 2.5 g/cm$^3$ or more. In addition, the density of the composite film in a case in which the LATP particles are use as the solid electrolyte particles is 2.8 g/cm$^3$ or less according to an example, and 2.7 g/cm$^3$ or less according to another example.

The density can be measured by, for example, the following method. First, the secondary battery is disassembled, and the composite film is extracted. Next, a portion of the composite film is cut to obtain a test piece. The test piece has, for example, a square plate shape whose side is 5 cm long. Then, the thickness of the test piece is measured, and the volume of the composite film is calculated. Next, the mass of the test piece is measured. The density of the composite film can be obtained from the thus obtained volume and mass.

The composite film preferably has flexibility. When the composite film has flexibility, a defect such as a crack becomes hard to occur in the composite film. Hence, when a separator including such a composite film is used, the negative electrode side and the positive electrode side can be more correctly spaced apart, and electrolysis of water can further be suppressed in the secondary battery. The degree of flexibility of the composite film can be adjusted by, for example, changing the type, amount, and the like of the polymeric material.

Whether the composite film has flexibility can be determined by, for example, conducting a bending test for the composite film. That is, first, the secondary battery is disassembled, and the composite film is extracted. Next, the composite film is cut to obtain a test piece. The test piece has, for example, a strip shape that is 2 cm long in the horizontal direction and 10 cm long in the vertical direction. Next, the test piece is immersed in water at a temperature of 23° C. for 24 hrs and dried. Then, a bending test is performed for the test piece after drying using a method defined in JIS C 5016: 1994 "Test methods for flexible printed wiring boards". In the bending test, the bending radius is, for example, 3 mm, and the bending count is 100. The test piece after the bending test is visually observed. If there is neither crack nor rupture, the composite film can be considered to have flexibility.

The film thickness of the composite film is preferably 100 μm or less, and more preferably 50 μm or less from the viewpoint of raising the energy density of the secondary battery. Since the composite film contains the polymeric material to be described later, a sufficient strength can be obtained even if the film thickness of the composite film is increased. In addition, from the viewpoint of raising the mechanical strength, the film thickness of the composite film is preferably 1 μm or more.

The separator may be a laminated body formed by stacking a porous membrane on at least one main surface of the composite film. When such a laminated body is used, the film strength of the separator can further be increased.

As the porous membrane, for example, a porous film or a nonwoven fabric can be used. As the material of the porous film or nonwoven fabric, for example, polyethylene (PE), polypropylene (PP), cellulose, or polyvinylidene fluoride (PVdF) can be used.

Note that when such a laminated separator is used, the porous membrane and the negative electrode preferably face each other across the composite film in the secondary battery. In addition, the composite film and the negative electrode are preferably in contact. When the composite film is arranged in this way, the above-described water decomposition suppressing effect can further be enhanced.

The composite film can be obtained by, for example, the following method. First, solid electrolyte particles, a polymeric material, and a solvent are mixed to obtain a solution mixture. In the solution mixture, the mass ratio of the solid electrolyte particles and the polymeric material is preferably set to 50:50 to 98:2. Note that an electrolyte salt may be optionally added to the solution mixture. In this case, in the solution mixture, the mass ratio of the solid electrolyte particles, the polymeric material, and the electrolyte salt is preferably set to 50:10 to 96:2:2.

As the solvent, a good solvent for the polymeric material is preferably used. The concentration of solid contents in the solution mixture is preferably set to 10 mass % to 60 mass %. Here, the solid content concentration means the total density of solid contents including the solid electrolyte particles, the polymeric material, and an arbitrarily added additive. Next, the solution mixture is sufficiently stirred using a dispersing machine such as a ball mill, thereby obtaining a slurry. Next, the slurry is applied to a substrate such as a Teflon® substrate using, for example, a doctor blade method and dried, thereby obtaining a composite film.

When a separator including a composite film containing the above-described polymeric material is used, the charge-and-discharge efficiency of the secondary battery can be raised. The reason for this will be described using, as an example, a secondary battery that uses lithium ions as the alkali metal ions.

First, when charging the secondary battery, some of the lithium ions move from the positive electrode side to the negative electrode side via the separator. Most lithium ions in the aqueous electrolyte on the positive electrode side are in a solvated state. Additionally, in the composite film included in the separator, the solid electrolyte particles and the polymeric material are almost evenly mixed. Hence, when charging starts, some of the solvated lithium ions on the positive electrode side come into contact with the solid electrolyte particles and the polymeric material on the main surface of the separator on the positive electrode side. Then, the solvated lithium ions that have come into contact with the solid electrolyte particles are desolvated, and only the lithium ions enter the separator. Some of the lithium ions move to the negative electrode side via the solid electrolyte particles in the separator and reach the negative electrode.

On the other hand, some of the solvated lithium ions that have come into contact with the polymeric material can enter the polymeric material. Some of the solvated lithium ions in the polymeric material move as solvated lithium ions until they come into contact with the solid electrolyte particles in the separator. Then, when some of the solvated lithium ions in the polymeric material come into contact with the solid electrolyte particles, they are desolvated, change to lithium ions, and move to the negative electrode side as in the above case. Note that when discharging the secondary battery, the lithium ions move in a direction reverse to that in charge. That is, at the time of discharge, at least some of the lithium ions on the negative electrode side move to the positive electrode side.

Here, as described above, the polymeric material contains a first monomer unit. The polymeric material containing the first monomer unit is not dissolved in the aqueous electrolyte too much, and can contain at least some of the solvated lithium ions. In addition, the functional group contained in the first monomer unit promotes the movement of the lithium ions in the composite film. For this reason, the composite film containing the polymeric material has excellent lithium ion conductivity, as compared to a separator using a film made of only solid electrolyte particles. Furthermore, since the composite film containing the polymeric material does not contain the aqueous electrolyte too much, as compared to a separator containing a polymeric material made of only a second monomer unit in place of the polymeric material. Hence, the composite film hardly permeates the aqueous solvent.

For this reason, the solvated lithium ions and the solvent of the aqueous electrolyte hardly pass through the separator and move to the negative electrode side. In addition, hydroxide ions existing near the negative electrode also probably rarely pass through the separator. Hence, even if charge and discharge are repeated, the pH of the aqueous electrolyte on the negative electrode side is kept high.

For the above-described reason, the secondary battery with the separator including the composite film can implement an excellent charge-and-discharge efficiency, as compared to a secondary battery that uses a porous film or a nonwoven fabric as a separator, a secondary battery that uses a film made of only solid electrolyte particles as a separator, and a secondary battery that uses a composite film containing a polymeric material made of only the second monomer unit as a separator.

4) Aqueous Electrolyte

The aqueous electrolyte contains an aqueous solvent and an electrolyte salt. The aqueous electrolyte may be a liquid. A liquid aqueous electrolyte is prepared by dissolving the electrolyte salt serving as a solute in the aqueous solvent.

As the electrolyte salt, for example, a lithium salt, a sodium salt, or a mixture thereof can be used. As the lithium salt or sodium salt, the same salt that can be contained in the composite film can be used. As the lithium salt, LiCl is preferably contained. When LiCl is used, the lithium ion concentration of the aqueous electrolyte can be made high. Additionally, the lithium salt preferably contains at least one of $LiSO_4$ and LiOH in addition to LiCl.

The mol concentration of lithium ions in the aqueous electrolyte is preferably 3 mol/L or more, more preferably 6 mol/L or more, and much more preferably 12 mol/L or more. When the concentration of the lithium ions in the aqueous electrolyte is high, electrolysis of the aqueous solvent in the negative electrode can easily be suppressed, and hydrogen generation from the negative electrode tends to be little.

In the aqueous electrolyte, the aqueous solvent amount is preferably 1 mol or more relative to 1 mol of the salt serving as a solute. In a more preferable form, the aqueous solvent amount relative to 1 mol of the salt serving as a solute is 3.5 mol or more.

The aqueous electrolyte preferably contains, as an anion species, at least one anion species selected from the group consisting of a chloride ion ($Cl^-$), a hydroxide ion ($OH^-$), a sulphate ion ($SO_4^{2-}$), and a nitrate ion ($NO_3^-$).

The pH of the aqueous electrolyte is preferably 3 to 14, and more preferably 4 to 13.

In addition, the pH of the aqueous electrolyte on the negative electrode side and that on the positive electrode side are preferably different after the initial charge. In the secondary battery after the initial charge, the pH of the aqueous electrolyte on the negative electrode side is preferably 3 or more, more preferably 5 or more, and much more preferably 7 or more. In the secondary battery after the initial charge, the pH of the aqueous electrolyte on the positive electrode side preferably falls within the range of 0 to 7, and more preferably falls within the range of 0 to 6.

The pHs of the aqueous electrolyte on the negative electrode side and the positive electrode side can be obtained by, for example, disassembling the secondary battery and measuring the pH of the aqueous electrolyte existing between the separator and the negative electrode and the pH of the aqueous electrolyte existing between the separator and the positive electrode.

As the aqueous solvent, a solution containing water can be used. Here the solution containing water may be pure water or a solvent mixture of water and an organic solvent.

The aqueous electrolyte may be a gel electrolyte. The gel electrolyte is prepared by mixing the above-described liquid aqueous electrolyte and a high-molecular compound and compounding them. As the high-molecular compound, for example, polyvinylidene fluoride (PVdF), polyacrylonitrile (PAN), polyethylene oxide (PEO), and the like can be used.

Whether the aqueous electrolyte contains water can be confirmed by GC-MS (Gas Chromatography-Mass Spectrometry). In addition, the salt concentration and water content in the aqueous electrolyte can be measured by, for example, ICP (Inductively Coupled Plasma) emission spectrometry. A predetermined amount of aqueous electrolyte is measured, and the concentrate of the contained salt is calculated, thereby calculating the mol concentration (mol/L). In addition, when the specific gravity of the aqueous electrolyte is measured, the number of moles in each of the solute and the solvent can be calculated.

5) Container

As the container that stores the positive electrode, the negative electrode, and the aqueous electrolyte, a metal container, a laminated film container, or a resin container can be used.

As the metal container, a metal can made of nickel, iron, stainless steel, or the like and having a rectangular shape or a cylindrical shape can be used. As the resin container, a container made of polyethylene, polypropylene, or the like can be used.

The board thickness of each of the resin container and the metal container preferably falls within the range of 0.05 mm to 1 mm. The board thickness is more preferably 0.5 mm or less, and much more preferably 0.3 mm or less.

As the laminated film, for example, a multilayered film formed by covering a metal layer with a resin layer can be used. Examples of the metal layer include a stainless steel foil, an aluminum foil, and an aluminum alloy foil. As the resin layer, a polymer such as polypropylene (PP), polyethylene (PE), nylon, or polyethylene terephthalate (PET) can be used. The thickness of the laminated film preferably falls within the range of 0.01 mm to 0.5 mm. The thickness of the laminated film is more preferably 0.2 mm or less.

6) Description of Details of Secondary Battery

The secondary battery according to this embodiment can be used in various forms such as a rectangular shape, a cylindrical shape, a flat type, a thin type, and a coin type. In addition, the secondary battery may be a secondary battery having a bipolar structure. This is advantageous in producing a plurality of serial cells by one cell.

Details of the secondary battery according to the first embodiment will be described below with reference to FIGS. 2, 3, 4, 5, and 6.

Figure 2:
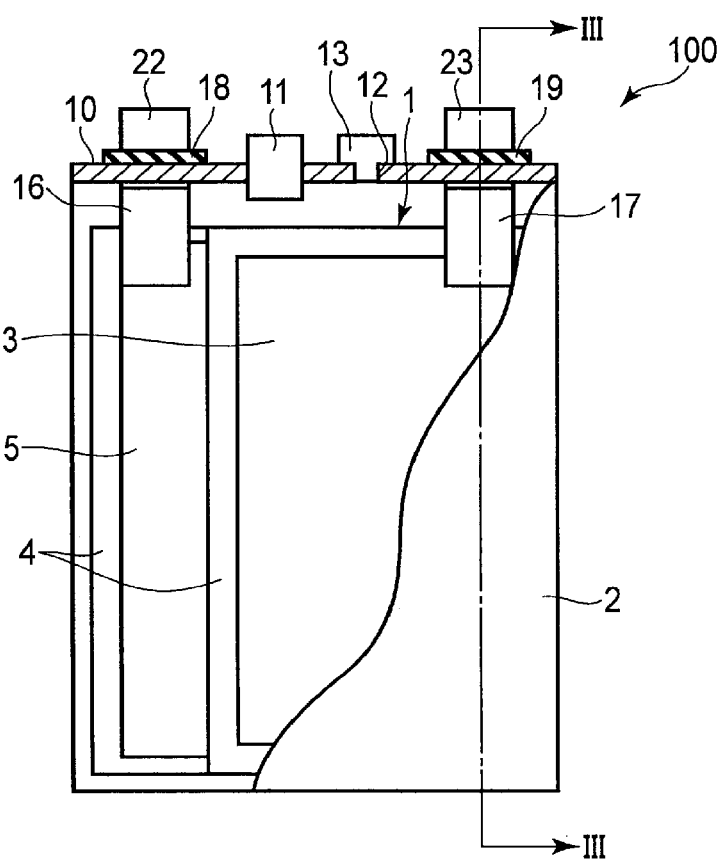
FIG. 2 is a sectional view schematically showing another example of the secondary battery according to the first embodiment.
Figure 3:
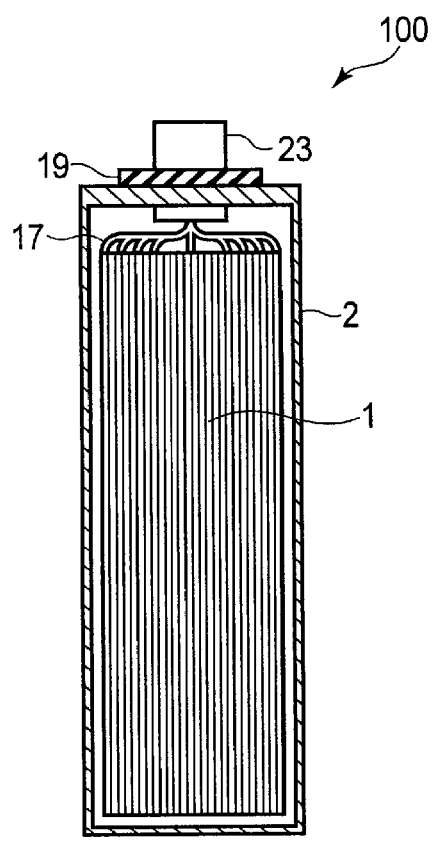
FIG. 3 is a sectional view of the secondary battery shown in FIG. 2 taken along a line III-III.

FIG. 2 is a sectional view schematically showing another example of the secondary battery according to the first embodiment. FIG. 3 is a sectional view of the secondary battery shown in FIG. 2 taken along a line III-III.

An electrode group 1 is stored in a rectangular tubular metal container 2. The electrode group 1 has a structure formed by spirally winding a positive electrode 5 and a negative electrode 3 with a separator 4 interposing therebetween so as to form a flat shape. An aqueous electrolyte (not shown) is held by the electrode group 1. As shown in FIG. 2, a strip-shaped positive electrode side lead 22 is electrically connected to each of a plurality of portions at an end of the positive electrode 5 located on an end face of the electrode group 1. In addition, a strip-shaped negative electrode side lead 23 is electrically connected to each of a plurality of portions at an end of the negative electrode 3 located on the end face. The plurality of positive electrode side leads 22 are electrically connected to a positive electrode tab 16 in a bundled state. A positive electrode terminal is formed from the positive electrode side leads 22 and the positive electrode tab 16. In addition, the negative electrode side leads 23 are electrically connected to a negative electrode tab 17 in a bundled state. A negative electrode terminal is formed from the negative electrode side leads 23 and the negative electrode tab 17. A sealing plate 10 made of a metal is fixed to the opening portion of the metal container 2 by welding or the like. The positive electrode tab 16 and the negative electrode tab 17 are extracted to the outside from outlet holes provided in the sealing plate 10, respectively. The inner surface of each outlet hole of the sealing plate 10 is coated with an insulating member to avoid a short circuit caused by contact between the positive electrode tab 16 and the negative electrode tab 17.

As shown in FIG. 3, the other end of the negative electrode tab 17 has a strip shape and is electrically connected to each of a plurality of portions of the negative electrode 3 located on the upper end face of the electrode group 1. Although not illustrated, similarly, the other end of the positive electrode tab 16 has a strip shape and is electrically connected to each of a plurality of portions of the positive electrode 5 located on the upper end face of the electrode group 1.

Referring to FIG. 2, the sealing plate 10 made of a metal is fixed to the opening portion of the metal container 2 by welding or the like. The positive electrode side leads 22 and the negative electrode side leads 23 are extracted to the outside from outlet holes provided in the sealing plate 10, respectively. On the inner surfaces of the outlet holes of the sealing plate 10, positive electrode gaskets 18 and negative electrode gaskets 19 are arranged to avoid a short circuit caused by contact between the positive electrode side leads 22 and the negative electrode side leads 23. When the positive electrode gaskets 18 and the negative electrode gaskets 19 are arranged, the airtightness of the rectangular secondary battery 100 can be maintained.

A control valve 11 (safety valve) is arranged in the sealing plate 10. If the internal pressure of the battery cell is raised by a gas generated by electrolysis of the aqueous solvent, the generated gas can be released from the control valve 11 to the outside. As the control valve 11, for example, a return type valve that operates when the internal pressure exceeds a set value and functions as a sealing plug when the internal pressure lowers can be used. Alternatively, a non-return type valve that cannot recover the function as a sealing plug once it operates can be used. In FIG. 2, the control valve 11 is arranged at the center of the sealing plate 10. However, the position of the control valve 11 may be an end of the sealing plate 10. The control valve 11 may be omitted.

Additionally, a liquid pouring port 12 is provided in the sealing plate 10. The aqueous electrolyte can be poured via the liquid pouring port 12. The liquid pouring port 12 can be closed by a sealing plug 13 after the aqueous electrolyte is poured. The liquid pouring port 12 and the sealing plug 13 may be omitted.

Figure 4:
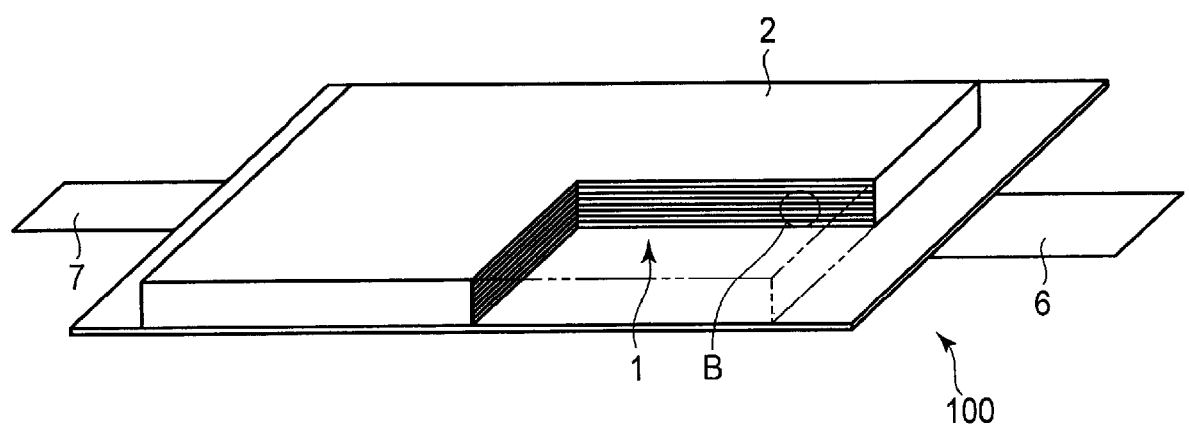
FIG. 4 is a partially cut-out perspective view schematically showing another example of a secondary battery according to the first embodiment.
Figure 5:
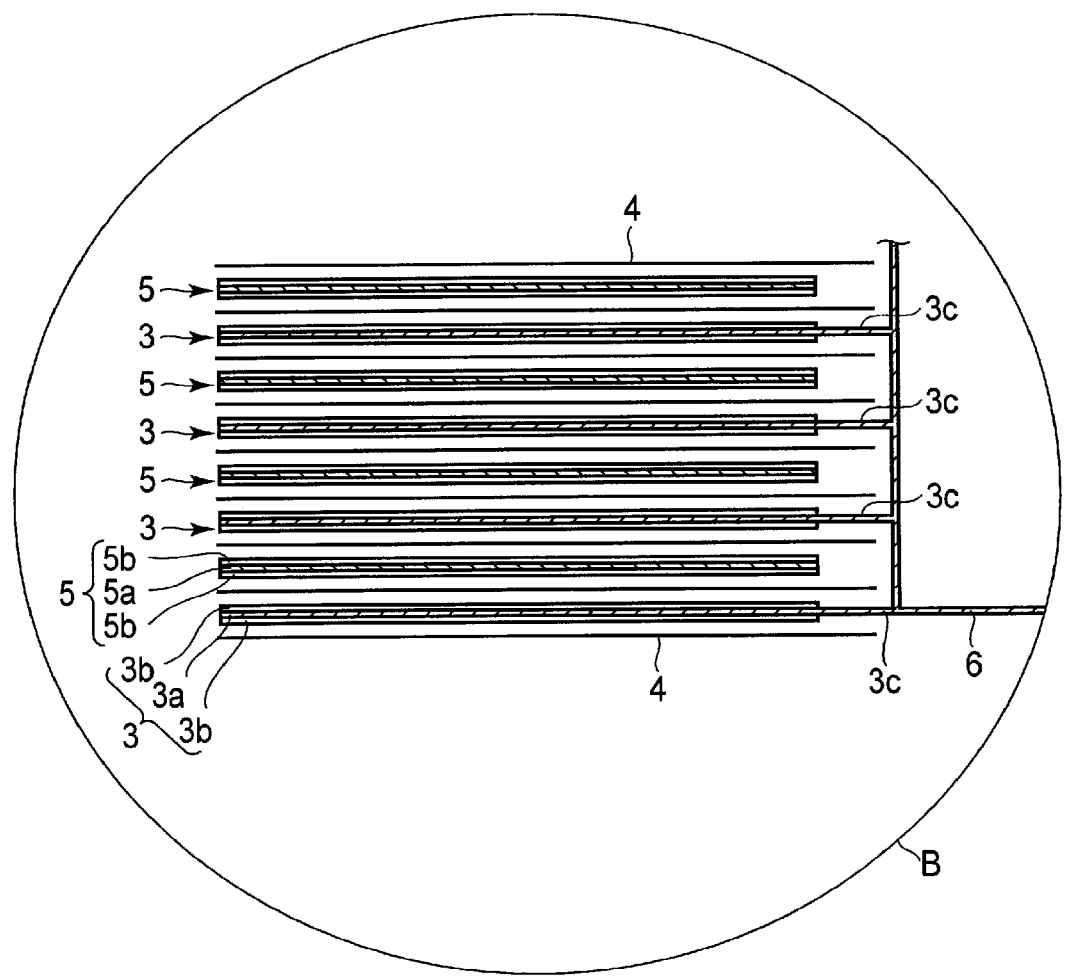
FIG. 5 is an enlarged cross-sectional view of section B of the secondary battery shown in FIG. 4.

FIG. 4 is a partially cut-out perspective view schematically showing another example of a secondary battery according to the first embodiment. FIG. 5 is an enlarged cross-sectional view of section B of the secondary battery shown in FIG. 4. FIG. 4 and FIG. 5 show an example of the secondary battery 100 used a laminated film container as a container.

The secondary battery 100 shown in FIGS. 4 and 5 includes an electrode group 1 shown in FIGS. 4 and 5, a container member 2 shown in FIG. 4, and an electrolyte, which is not shown. The electrode group 1 and the electrolyte are housed in the container member 2. The electrolyte is held in the electrode group 1.

The container member 2 is made of a laminate film including two resin layers and a metal layer sandwiched between the resin layers.

As shown in FIG. 5, the electrode group 1 is a stacked electrode group. The stacked electrode group 1 has a structure in which positive electrodes 3 and negative electrodes 5 are alternately stacked with separator(s) 4 sandwiched therebetween.

The electrode group 1 includes a plurality of the negative electrodes 3. Each of the negative electrodes 3 includes the negative electrode current collector 3a and the negative electrode active material-containing layers 3b supported on both surfaces of the negative electrode current collector 3a. The electrode group 1 further includes a plurality of the positive electrodes 5. Each of the positive electrodes 5 includes the positive electrode current collector 5a and the positive electrode active material-containing layers 5b supported on both surfaces of the positive electrode current collector 5a.

The negative electrode current collector 3a of each of the negative electrodes 3 includes at its side a portion 3c where the negative electrode active material-containing layer 3b is not supported on any surface. This portion 3c serves as a negative electrode tab. As shown in FIG. 5, the portion 3c serving as the negative electrode tab does not overlap the positive electrode 5. A plurality of the negative electrode tabs (portions 3c) are electrically connected to the belt-like negative electrode terminal 6. A leading end of the belt-like negative electrode terminal 6 is drawn to the outside from a container member 2.

Although not shown, the positive electrode current collector 5a of each of the positive electrodes 5 includes at its side a portion where the positive electrode active material-containing layer 5b is not supported on any surface. This portion serves as a positive electrode tab. Like the negative electrode tab (portion 3c), the positive electrode tab does not overlap the negative electrode 3. Further, the positive electrode tab is located on the opposite side of the electrode group 1 with respect to the negative electrode tab (portion 3c). The positive electrode tab is electrically connected to the belt-like positive electrode terminal 7. A leading end of the belt-like positive electrode terminal 7 is located on the opposite side of the negative electrode terminal 6 and drawn to the outside from the container member 2.

The secondary battery according to the first embodiment includes the separator including the above-described composite film. The composite film is difficult to make the aqueous solvent permeate and is excellent in lithium ion conductivity. Hence, the secondary battery according to the first embodiment can implement a high charge-and-discharge efficiency and safety.

Second Embodiment

According to a second embodiment, a battery module is provided. The battery module according to the second embodiment includes plural secondary batteries according to the first embodiment.

In the battery module according to the second embodiment, each of the single batteries may be arranged electrically connected in series, in parallel, or in a combination of in-series connection and in-parallel connection.

An example of the battery module according to the second embodiment will be described next with reference to the drawings.

FIG. 6 is a perspective view schematically showing an example of the battery module according to the second embodiment. A battery module 200 shown in FIG. 6 includes five single-batteries 100a to 100e, four bus bars 21, a positive electrode-side lead 22, and a negative electrode-side lead 23. Each of the five single-batteries 100a to 100e is a secondary battery according to the first embodiment.

Each bus bar 21 connects a negative electrode terminal 6 of one single-battery 100a and a positive electrode terminal 7 of the single-battery 100b positioned adjacent. The five single-batteries 100 are thus connected in series by the four bus bars 21. That is, the battery module 200 shown in FIG. 6 is a battery module of five in-series connection.

As shown in FIG. 6, the positive electrode terminal 7 of the single-battery 100a located at one end on the left among the row of the five single-batteries 100a to 100e is connected to the positive electrode-side lead 22 for external connection. In addition, the negative electrode terminal 6 of the single-battery 100e located at the other end on the right among the row of the five single-batteries 100a to 100e is connected to the negative electrode-side lead 23 for external connection.

The battery module according to the second embodiment includes the secondary battery according to the first embodiment. Hence, the battery module according to the second embodiment is excellent in the charge-and-discharge efficiency and safety.

Third Embodiment

According to a third embodiment, a battery pack is provided. The battery pack includes a battery module according to the second embodiment. The battery pack may include a single secondary battery according to the first embodiment, in place of the battery module according to the second embodiment.

The battery pack according to the third embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the third embodiment may further comprise an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the third embodiment will be described with reference to the drawings.

Figure 8:
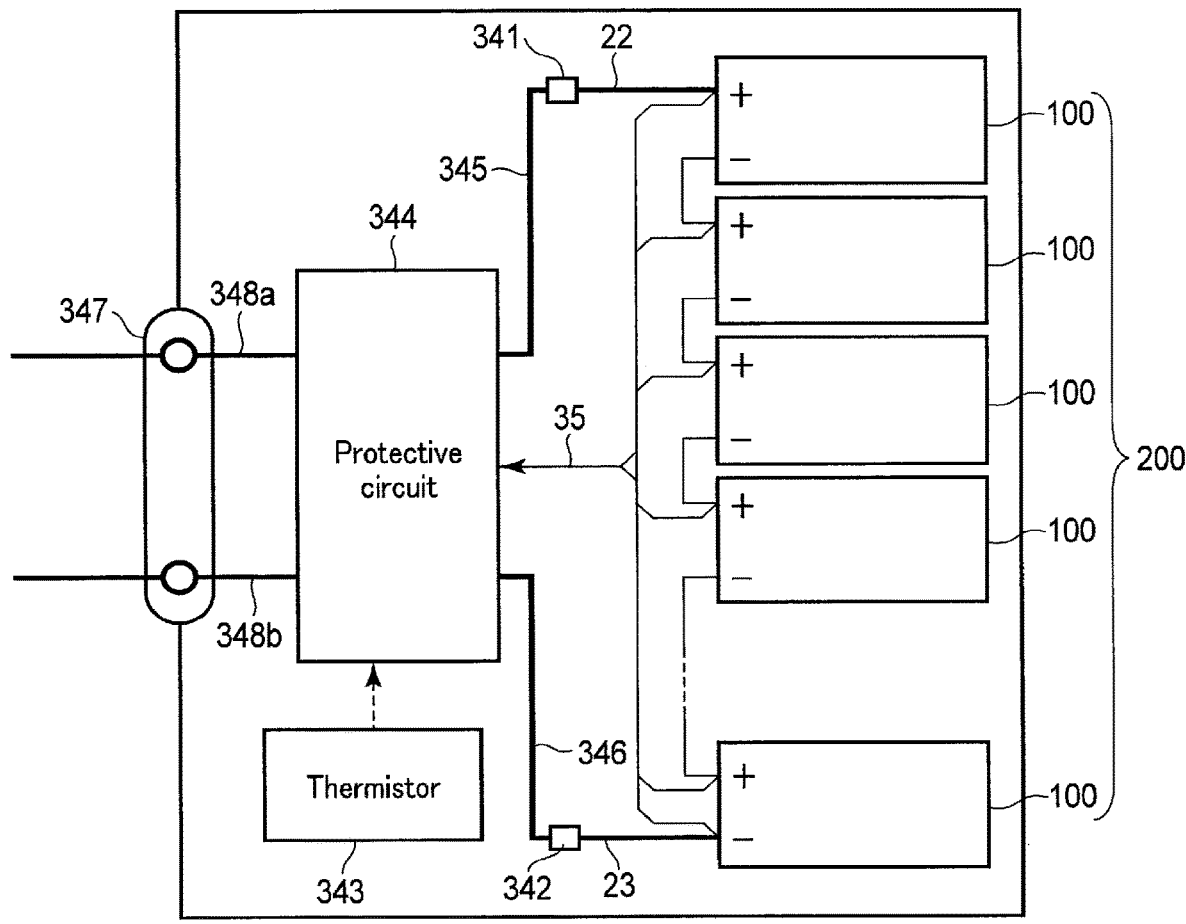
FIG. 8 is a block diagram showing an example of an electric circuit of the battery pack shown in FIG. 7.

FIG. 7 is an exploded perspective view schematically showing an example of the battery pack according to the third embodiment. FIG. 8 is a block diagram showing an example of an electric circuit of the battery pack shown in FIG. 7.

A battery pack 300 shown in FIGS. 7 and 8 includes a housing container 31, a lid 32, protective sheets 33, a battery module 200, a printed wiring board 34, wires 35, and an insulating plate (not shown).

The housing container 31 shown in FIG. 7 is a square bottomed container having a rectangular bottom surface. The housing container 31 is configured to be capable of storing the protective sheets 33, the battery module 200, the printed wiring board 34, and the wires 35. The lid 32 has a rectangular shape. The lid 32 covers the housing container 31 to store the battery module 200 and so on. The housing container 31 and the lid 32 are provided with openings, connection terminals, or the like (not shown) for connection to an external device or the like.

The battery module 200 includes plural single-batteries 100, a positive electrode-side lead 22, a negative electrode-side lead 23, and an adhesive tape 24.

At least one of the plural single-batteries 100 is a secondary battery according to the first embodiment. The plural single-batteries 100 are stacked such that the negative electrode terminals 6 and the positive electrode terminals 7, which extend outside, are directed toward the same direction. The plural single-batteries 100 are electrically connected in series, as shown in FIG. 8. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape 24 fastens the plural single-batteries 100. The plural single-batteries 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural single-batteries 100.

One end of the positive electrode-side lead 22 is connected to the positive electrode terminal 7 of the single-battery 100 located lowermost in the stack of the single-batteries 100. One end of the negative electrode-side lead 23 is connected to the negative electrode terminal 6 of the single-battery 100 located uppermost in the stack of the single-batteries 100.

A printed wiring board 34 is disposed on the one inner surface along the short-side direction of inner surfaces of the housing container 31. The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One main surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through-hole. By inserting the other end of the positive electrode-side lead 22 into the though-hole, the positive electrode-side connector 341 and the positive electrode-side lead 22 become electrically connected. The negative electrode-side connector 342 is provided with a through-hole. By inserting the other end of the negative electrode-side lead 23 into the though-hole, the negative electrode-side connector 342 and the negative electrode-side lead 23 become electrically connected.

The thermistor 343 is fixed to one main surface of the printed wiring board 34. The thermistor 343 detects the temperature of each single-battery 100 and transmits detection signals to the protective circuit 344.

The external power distribution terminal 347 is fixed to the other main surface of the printed wiring board 34. The external power distribution terminal 347 is electrically connected to device(s) that exists outside the battery pack 300.

The protective circuit 344 is fixed to the other main surface of the printed wiring board 34. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural single-batteries 100 via the wires 35.

The protective sheets 33 are arranged on both inner surfaces of the housing container 31 along the long-side direction and on the inner surface along the short-side direction, facing the printed wiring board 34 across the battery module 200 positioned therebetween. The protective sheets 33 are made of, for example, resin or rubber.

The protective circuit 344 controls charge and discharge of the plural single-batteries 100. The protective circuit 344 is also configured to cut-off electric connection between the protective circuit 344 and the external power distribution terminal 347 to external devices, based on detection signals transmitted from the thermistor 343 or detection signals transmitted from each single-battery 100 or the battery module 200.

An example of the detection signal transmitted from the thermistor 343 is a signal indicating that the temperature of the single-battery (single-batteries) 100 is detected to be a predetermined temperature or more. An example of the detection signal transmitted from each single-battery 100 or the battery module 200 is a signal indicating detection of over-charge, over-discharge, and overcurrent of the single-battery (single-batteries) 100. When detecting over-charge or the like for each of the single batteries 100, the battery voltage may be detected, or a positive electrode potential or negative electrode potential may be detected. In the latter case, a lithium electrode to be used as a reference electrode may be inserted into each single battery 100.

Note that, as the protective circuit 344, a circuit included in a device (for example, an electronic device or an automobile) that uses the battery pack 300 as a power source may be used.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

Such a battery pack is used, for example, in applications where excellent cycle performance is demanded when a large current is extracted. More specifically, the battery pack is used as, for example, a power source for electronic devices, a stationary battery, or an onboard battery for vehicles. An example of the electronic device is a digital camera. The battery pack 300 is particularly favorably used as an onboard battery.

The battery pack according to the third embodiment includes the secondary battery according to the first embodiment or the battery module according to the second embodiment. Hence, the battery pack according to the third embodiment is excellent in the charge-and-discharge efficiency and safety.

Fourth Embodiment

According to a fourth embodiment, a vehicle is provided. The battery pack according to the third embodiment is installed on this vehicle.

In the vehicle according to the fourth embodiment, the battery pack is configured, for example, to recover regenerative energy from motive force of the vehicle.

Examples of the vehicle according to the fourth embodiment include two- to four-wheeled hybrid electric automobiles, two- to four-wheeled electric automobiles, electric assist bicycles, and railway cars.

In the vehicle according to the fourth embodiment, the installing position of the battery pack is not particularly limited. For example, the battery pack may be installed in the engine compartment of the vehicle, in rear parts of the vehicle, or under seats.

The vehicle according to the fourth embodiment may be equipped with a plurality of battery packs. In this case, the battery packs may be electrically connected in series, may be electrically connected in parallel, or may be electrically connected in a combination of series connection and parallel connection.

An example of the vehicle according to the fourth embodiment is explained below, with reference to the drawings.

Figure 9:
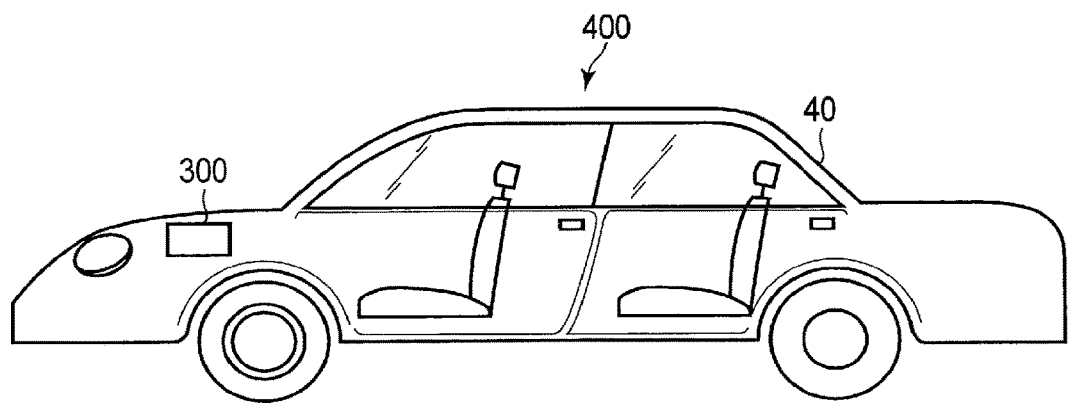
FIG. 9 is a cross-sectional view schematically showing an example of a vehicle according to the fourth embodiment; and, FIG. 10 is a view schematically showing another example of the vehicle according to the fourth embodiment.

FIG. 9 is a cross-sectional view schematically showing an example of a vehicle according to the fourth embodiment.

A vehicle 400, shown in FIG. 9 includes a vehicle body 40 and a battery pack 300 according to the fourth embodiment. In FIG. 9, the vehicle 400 is a four-wheeled automobile.

This vehicle 400 may have plural battery packs 300 installed. In such a case, the battery packs 300 may be connected in series, connected in parallel, or connected in a combination of in-series connection and in-parallel connection.

An example is shown in FIG. 9, where the battery pack 300 is installed in an engine compartment located at the front of the vehicle body 40. As described above, the battery pack 300 may be installed, for example, in rear sections of the vehicle body 40, or under a seat. The battery pack 300 may be used as a power source of the vehicle 400. The battery pack 300 can also recover regenerative energy of power of the vehicle 400.

Figure 10:
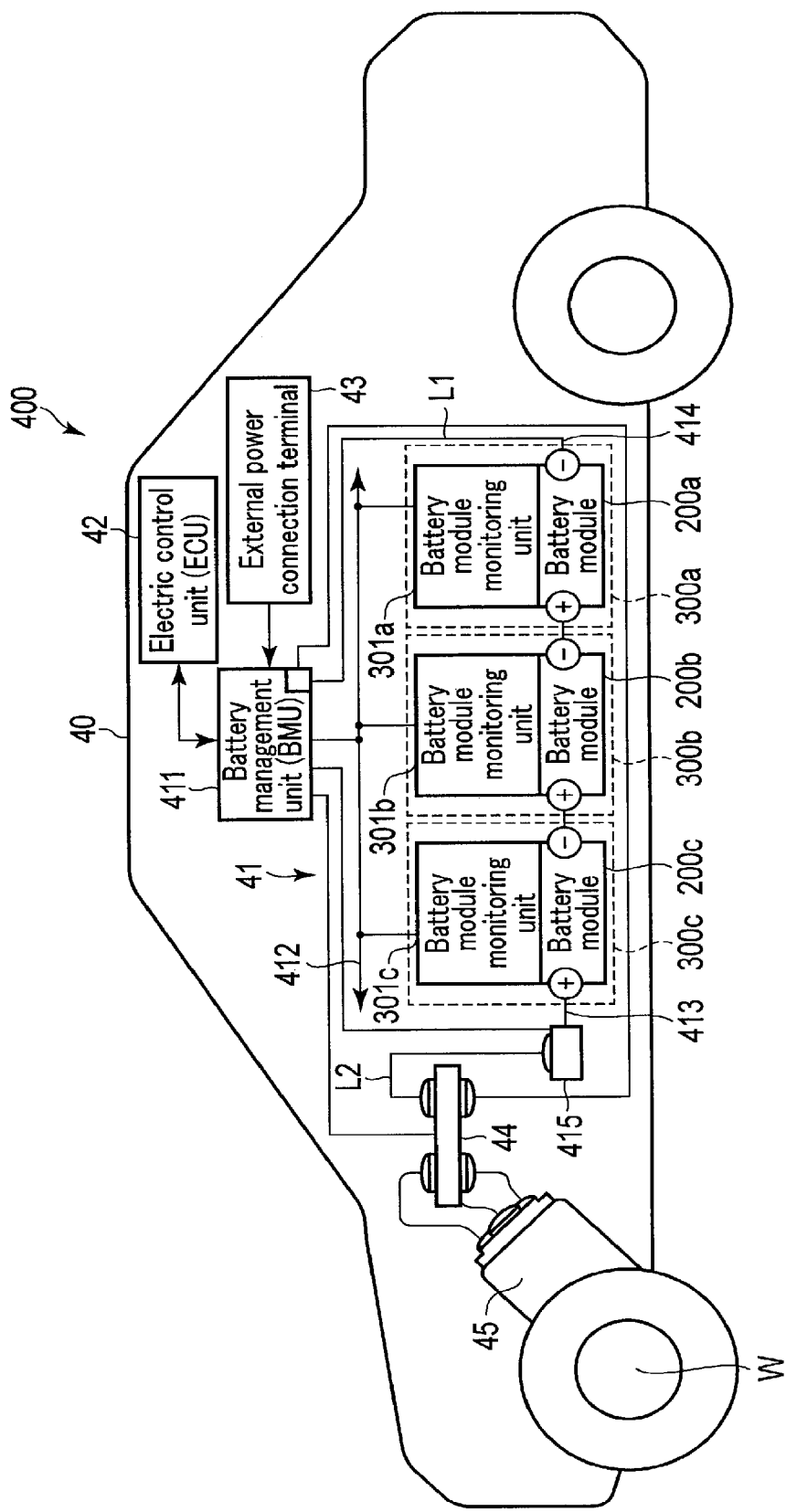

Next, with reference to FIG. 10, an aspect of operation of the vehicle according to the fourth embodiment is explained.

FIG. 10 is a view schematically showing another example of the vehicle according to the fourth embodiment. A vehicle 400, shown in FIG. 10, is an electric automobile.

The vehicle 400, shown in FIG. 10, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 10, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The three battery packs 300a, 300b and 300c are electrically connected in series. The battery pack 300a includes a battery module 200a and a battery module monitoring unit (for example, VTM: voltage temperature monitoring) 301a. The battery pack 300b includes a battery module 200b, and a battery module monitoring unit 301b. The battery pack 300c includes a battery module 200c, and a battery module monitoring unit 301c. The battery packs 300a, 300b and 300c can each be independently removed, and may be exchanged by a different battery pack 300.

Each of the battery modules 200a to 200c includes plural single-batteries connected in series. At least one of the plural single-batteries is the secondary battery according to the first embodiment. The battery modules 200a to 200c each perform charging and discharging via a positive electrode terminal 413 and a negative electrode terminal 414.

In order to collect information concerning security of the vehicle power source 41, the battery management unit 411 performs communication with the battery module monitoring units 301a to 301c and collects information such as voltages or temperatures of the single-batteries 100 included in the battery modules 200a to 200c included in the vehicle power source 41.

The communication bus 412 is connected between the battery management unit 411 and the battery module monitoring units 301a to 301c. The communication bus 412 is configured so that multiple nodes (i.e., the battery management unit and one or more battery module monitoring units) share a set of communication lines. The communication bus 412 is, for example, a communication bus configured based on CAN (Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 may also have an electromagnetic contactor (for example, a switch unit 415 shown in FIG. 9) for switching connection between the positive electrode terminal 413 and the negative electrode terminal 414. The switch unit 415 includes a precharge switch (not shown), which is turned on when the battery modules 200a to 200c are charged, and a main switch (not shown), which is turned on when battery output is supplied to a load. The precharge switch and the main switch include a relay circuit (not shown), which is turned on or off based on a signal provided to a coil disposed near a switch element.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 controls an output voltage based on control signals from the battery management unit 411 or the vehicle ECU 42, which controls the entire operation of the vehicle.

The drive motor 45 is rotated by electric power supplied from the inverter 44. The rotation is transferred to an axle and driving wheels W via a differential gear unit, for example.

The vehicle 400 also includes a regenerative brake mechanism, though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The direct current is inputted into the vehicle power source 41.

One terminal of a connecting line L1 is connected via a current detector (not shown) in the battery management unit 411 to the negative electrode terminal 414 of the vehicle power source 41. The other terminal of the connecting line L1 is connected to a negative electrode input terminal of the inverter 44.

One terminal of a connecting line L2 is connected via the switch unit 415 to the positive electrode terminal 413 of the vehicle power source 41. The other terminal of the connecting line L2 is connected to a positive electrode input terminal of the inverter 44.

The external terminal 43 is connected to the battery management unit 411. The external terminal 43 is able to connect, for example, to an external power source.

The vehicle ECU 42 cooperatively controls the battery management unit 411 together with other units in response to inputs operated by a driver or the like, thereby performing the management of the whole vehicle. Data concerning the security of the vehicle power source 41, such as a remaining capacity of the vehicle power source 41, are transferred between the battery management unit 411 and the vehicle ECU 42 via communication lines.

The vehicle according to the fourth embodiment includes the battery pack according to the third embodiment. Hence, the vehicle according to the fourth embodiment can implement a long life.

EXAMPLES

Examples will be described below. The embodiments are not limited to the following examples.

Example 1

<Production of Positive Electrode>

A positive electrode was produced in the following way. First, a positive electrode active material, a conductive agent, and a binder were dispersed in a N-methyl-2-pyrrolidone (NMP) solvent to prepare a slurry. The ratios of the positive electrode active material, the conductive agent, and the binder were 80 mass %, 10 mass %, and 10 mass %, respectively. As the positive electrode active material, a lithium manganese oxide ($LiMn_2O_4$) having a spinel structure and an average particle size of 10 μm was used. The lithium ion insertion/extraction potential of the lithium manganese oxide was 3.5 V (vs. $Li/Li^+$) to 4.2 V (vs. $Li/Li^+$). As the conductive agent, a graphite powder was used. As the binder, polyacrylimide (PAI) was used.

Next, the prepared slurry was applied to both surfaces of a positive electrode current collector, and the coatings were dried, thereby forming a positive electrode active material-containing layer. As the positive electrode current collector, a Ti foil having a thickness of 12 μm was used. Next, the positive electrode current collector and the positive electrode active material-containing layer were pressed to prepare a positive electrode. The density of the positive electrode active material-containing layer was 3.0 $g/cm^3$.

<Production of Negative Electrode>

A negative electrode was produced in the following way.

First, a negative electrode active material, a conductive agent, and a binder were dispersed in an NMP solvent to prepare a slurry. As the negative electrode active material, a lithium titanium oxide ($Li_4Ti_5O_{12}$) powder having an average secondary particle size (diameter) of 15 μm was used. The lithium ion insertion/extraction potential of the lithium titanium oxide was 1.5 V (vs. $Li/Li^+$) to 1.7 V (vs. $Li/Li^+$). As the conductive agent, a graphite powder was used. As the binder, PAI was used. The ratios of the negative electrode active material, the conductive agent, and the binder were 80 mass %, 10 mass %, and 10 mass %, respectively.

Next, the obtained slurry was applied to a negative electrode current collector, and the coating was dried, thereby forming a negative electrode active material-containing layer. As the negative electrode current collector, a Ti foil having a thickness of 50 μm was used. Here, when applying the slurry to the Ti foil, for a portion located in the outermost periphery of the electrode group in the negative electrode to be produced, the slurry was applied to only one surface of the Ti foil. For the remaining portions, the slurry was applied to both surfaces of the Ti foil. Next, the negative electrode current collector and the negative electrode active material-containing layer were pressed to obtain a negative electrode. The density of the negative electrode active material containing layer was 2.0 $g/cm^3$.

<Production of Separator>

Glass solid electrolyte LATP ($Li_{1.5}Al_{0.5}Ti_{1.5}(PO_4)_3$) particles, a polyvinyl formal resin, lithium bis(trifluoromethanesulfonyl)imide (LiTFSI), and tetrahydrofuran (THF) were mixed to obtain a solution mixture. The average particle size of the LATP particles was 1.0 μm. The weight-average molecular weight of the polyvinyl formal resin was about 100,000. Note that the water absorption capacity of the polyvinyl formal resin obtained by the above-described method was 3%. The mass ratio of the LATP particles, the polyvinyl formal resin, and LiTFSI was 9:1:0.1. The concentration of solid contents in the solution mixture was 10 mass %.

Next, the solution mixture was mixed by a ball mill for 24 hrs, thereby obtaining a slurry. Next, the slurry was deposited on a Teflon® substrate using, for example, a doctor blade method, thereby obtaining a composite film. The thickness of the composite film was about 50 μm. The ratio of the LATP particles in the composite film was 89.1 mass %, the ratio of the polyvinyl formal resin was 9.9 mass %, and the ratio of the LiTFSI was 1.0 mass %. The composite film will be referred to as a separator SP1 hereinafter. Note that a plurality of separators SP1 were produced.

<Production of Electrode Group>

The positive electrode, the first separator SP1, the negative electrode, and the second separator SP1 were laminated in this order to obtain a laminated body. Next, the laminated body was spirally wound such that the negative electrode was located in the outermost periphery, thereby producing an electrode group. The electrode group was hot-pressed at 90° C. to produce a flat electrode group. The obtained electrode group was stored in a thin metal can made of stainless steel having a thickness of 0.25 mm. Note that as the metal can, a can in which a valve configured to leak a gas when the internal pressure became 2 atm or more was placed was used.

<Preparation of Aqueous Electrolyte>

Lithium chloride (LiCl) and lithium sulfate ($Li_2SO_4$) were dissolved in water to obtain a liquid aqueous electrolyte. In the aqueous electrolyte, the mol concentration of LiCl was 3 mol/L, and the mol concentration of $Li_2SO_4$ was 0.25 mol/L.

<Production of Secondary Battery and Initial Charge and Discharge>

The liquid aqueous electrolyte was poured into the above-described metal can container storing the electrode group, thereby producing a secondary battery. Next, the secondary battery was left stand under a 25° C. environment for 24 hrs. After that, the secondary battery was submitted for initial charge and discharge under a 25° C. environment. In the initial charge and discharge, first, constant current charge was performed by a current of 5 A until the voltage of the secondary battery reached 2.8 V. Next, constant current discharge was performed by a current of 1 A until the voltage reached 1.5 V. Additionally, in the initial charge and discharge, the capacity of the secondary battery was confirmed.

Example 2

A composite film was obtained in accordance with the same procedure as described in Example 1 except that the mass ratio of the LATP particles and the polyvinyl formal resin was changed from 9:1 to 8:2. The ratio of the LATP particles in the composite film was 79.2 mass %, the ratio of the polyvinyl formal resin was 19.8 mass %, and the ratio of the LiTFSI was 1.0 mass %. The composite film will be referred to as a separator SP2 hereinafter.

A secondary battery was obtained in accordance with the same procedure as described in Example 1 except that the separator SP2 was used in place of the separator SP1.

Example 3

A composite film was obtained in accordance with the same procedure as described in Example 1 except that LiTFSI was omitted. The ratio of the LATP particles in the composite film was 90.0 mass %, and the ratio of the polyvinyl formal resin was 10.0 mass %. The composite film will be referred to as a separator SP3 hereinafter.

A secondary battery was obtained in accordance with the same procedure as described in Example 1 except that the separator SP3 was used in place of the separator SP1.

Example 4

A composite film was obtained in accordance with the same procedure as described in Example 1 except that LLZ particles were used in place of the LATP particles. The average particle size of the LLZ particles was 1.5 μm. The composite film will be referred to as a separator SP4 hereinafter.

A secondary battery was obtained in accordance with the same procedure as described in Example 1 except that the separator SP4 was used in place of the separator SP1.

Example 5

A composite film was obtained in accordance with the same procedure as described in Example 1 except that a polymethyl methacrylate resin (PMMA) was used in place of the polyvinyl formal resin. The weight-average molecular weight of the PMMA was about 100,000. The water absorption capacity of the PMMA was 0.5%. The composite film will be referred to as a separator SP5 hereinafter.

A secondary battery was obtained in accordance with the same procedure as described in Example 1 except that the separator SP5 was used in place of the separator SP1.

Example 6

A secondary battery was obtained in accordance with the same procedure as described in Example 1 except that a mixture of $Li_4Ti_5O_{12}$ and a rutile type titanium oxide ($TiO_2$) was used as a negative electrode active material in place of the lithium titanium oxide ($Li_4Ti_5O_{12}$). The lithium ion insertion/extraction potential of the rutile type titanium oxide was 2.0 V (vs. $Li/Li^+$) to 2.9 V (vs. $Li/Li^+$). The mass ratio of the $Li_4Ti_5O_{12}$ and the rutile type titanium oxide ($TiO_2$) in the mixture was 80:20.

Example 7

A secondary battery was obtained in accordance with the same procedure as described in Example 1 except that a niobium titanium composite oxide ($Nb_2TiO_7$) was used as a negative electrode active material in place of the lithium titanium oxide ($Li_4Ti_5O_{12}$). The lithium ion insertion/extraction potential of the niobium titanium composite oxide was 1.3 V (vs. $Li/Li^+$) to 1.5 V (vs. $Li/Li^+$).

Example 8

A secondary battery was obtained in accordance with the same procedure as described in Example 1 except that a sodium niobium titanium composite oxide ($Li_2Na_{1.5}Ti_{5.5}Nb_{0.5}O_{14}$) was used as a negative electrode active material in place of the lithium titanium oxide ($Li_4Ti_5O_{12}$). The lithium ion insertion/extraction potential of the sodium niobium titanium composite oxide was 1.0 V (vs. $Li/Li^+$) to 1.3 V (vs. $Li/Li^+$).

Example 9

A secondary battery was obtained in accordance with the same procedure as described in Example 1 except that a lithium cobaltate ($LiCoO_2$) was used as a positive electrode active material in place of the lithium manganese oxide ($LiMn_2O_4$). The lithium ion insertion/extraction potential of the lithium cobaltate was 3.5 V (vs. $Li/Li^+$) to 4.0 V (vs. $Li/Li^+$).

Example 10

A secondary battery was obtained in accordance with the same procedure as described in Example 1 except that an olivine iron phosphate lithium ($LiFePO_4$) was used as a positive electrode active material in place of the lithium manganese oxide ($LiMn_2O_4$). The lithium ion insertion/extraction potential of the iron phosphate lithium was 3.0 V (vs. $Li/Li^+$) to 3.5 V (vs. $Li/Li^+$).

Example 11

A composite film was obtained in accordance with the same procedure as described in Example 1 except that a polyvinyl alcohol resin was used in place of the polyvinyl formal resin. The weight-average molecular weight of the polyvinyl alcohol resin was about 150,000. The water absorption capacity of the polyvinyl alcohol resin was 15%. The composite film will be referred to as a separator SP6 hereinafter.

A secondary battery was obtained in accordance with the same procedure as described in Example 1 except that the separator SP6 was used in place of the separator SP1.

Example 12

A secondary battery was obtained in accordance with the same procedure as described in Example 1 except that for the electrolyte salt, the mol concentration of LiCl was changed from 3 mol/L to 12 mol/L, and $LiSO_4$ was omitted.

Example 13

A composite film was obtained in accordance with the same procedure as described in Example 1 except that a polyvinyl butyral resin was used in place of the polyvinyl formal resin. The weight-average molecular weight of the polyvinyl butyral resin was about 70,000. The water absorption capacity of the polyvinyl butyral resin was 2%. The composite film will be referred to as a separator SP7 hereinafter.

A secondary battery was obtained in accordance with the same procedure as described in Example 1 except that the separator SP7 was used in place of the separator SP1, and for the electrolyte salt, the mol concentration of LiCl was changed from 3 mol/L to 12 mol/L, and $LiSO_4$ was omitted.

Example 14

A composite film was obtained in accordance with the same procedure as described in Example 1 except that a block copolymer CP1 of methyl methacrylate (MMA) and ethylene oxide (EO) was used in place of the polyvinyl formal resin. The ratio of the MMA in the copolymer CP1 was 90 mol %. The weight average molecular weight of the copolymer CP1 was about 90,000. The water absorption capacity of the copolymer CP1 was 7%. The composite film will be referred to as a separator SP8 hereinafter.

A secondary battery was obtained in accordance with the same procedure as described in Example 1 except that the separator SP8 was used in place of the separator SP1.

Example 15

A composite film was obtained in accordance with the same procedure as described in Example 1 except that a block copolymer CP2 of MMA and EO was used in place of the polyvinyl formal resin. The ratio of the MMA in the copolymer CP2 was 70 mol %. The weight-average molecular weight of the copolymer CP2 was about 80,000. The water absorption capacity of the copolymer CP2 was 9.5%. The composite film will be referred to as a separator SP9 hereinafter.

A secondary battery was obtained in accordance with the same procedure as described in Example 1 except that the separator SP9 was used in place of the separator SP1.

Example 16

A composite film was obtained in accordance with the same procedure as described in Example 1 except that polytetrafluoroethylene (PTFE) was used in place of the polyvinyl formal resin. The specific gravity of the PTFE was 2.17. The water absorption capacity of the PTFE was 0.01%. The composite film will be referred to as a separator SP10 hereinafter.

A secondary battery was obtained in accordance with the same procedure as described in Example 1 except that the separator SP10 was used in place of the separator SP1.

Example 17

A secondary battery was obtained in accordance with the same procedure as described in Example 1 except that LiCl and LiOH were used as electrolyte salts in place of LiCl and $LiSO_4$. The mol ratio of LiCl and LiOH was 4:1. In addition, the mol concentration of the mixture of LiCl and LiOH in the aqueous electrolyte was 6 mol/L.

Comparative Example 1

A secondary battery was obtained in accordance with the same procedure as described in Example 1 except that a nonwoven fabric NF1 made of cellulose was used in place of the separator SP1. Note that the thickness of the nonwoven fabric NF1 made of cellulose was 20 μm.

Comparative Example 2

A secondary battery was obtained in accordance with the same procedure as described in Example 12 except that a nonwoven fabric NF1 made of cellulose was used in place of the separator SP1.

Comparative Example 3

A composite film was obtained in accordance with the same procedure as described in Example 1 except that a block copolymer CP3 of MMA and EO was used in place of the polyvinyl formal resin. The ratio of the MMA in the copolymer CP3 was 50 mol %. The weight-average molecular weight of the copolymer CP3 was about 90,000. The water absorption capacity of the copolymer CP3 was 30%. The composite film will be referred to as a separator SP11 hereinafter.

A secondary battery was obtained in accordance with the same procedure as described in Example 1 except that the separator SP11 was used in place of the separator SP1.

Comparative Example 4

A composite film was obtained in accordance with the same procedure as described in Example 1 except that a block copolymer CP4 of styrene and EO was used in place of the polyvinyl formal resin. The ratio of the styrene in the copolymer CP4 was 70 mol %. The weight average molecular weight of the copolymer CP4 was about 60,000. The water absorption capacity of the copolymer CP4 was 8.7%. The composite film will be referred to as a separator SP12 hereinafter.

A secondary battery was obtained in accordance with the same procedure as described in Example 1 except that the separator SP12 was used in place of the separator SP1.

Comparative Example 5

A composite film was obtained in accordance with the same procedure as described in Example 1 except that a block copolymer CP5 of styrene and EO was used in place of the polyvinyl formal resin. The ratio of the styrene in the copolymer CP5 was 50 mol %. The water absorption capacity of the copolymer CP5 was 21%. The composite film will be referred to as a separator SP13 hereinafter.

A secondary battery was obtained in accordance with the same procedure as described in Example 1 except that the separator SP13 was used in place of the separator SP1.

Comparative Example 6

A composite film was obtained in accordance with the same procedure as described in Example 1 except that the polyvinyl formal resin and LiTFSI were omitted. The composite film will be referred to as a separator SP14 hereinafter.

When producing a secondary battery using the separator SP14 in place of the separator SP1, the separator SP14 was ruptured at the stage of winding the electrode group. For this reason, a secondary battery could not be produced.

Reference Example 1

A nonaqueous secondary battery was obtained in accordance with the same procedure as described in Example 1 except that a nonaqueous electrolyte was used in place of the aqueous electrolyte, and a nonwoven fabric NF1 made of cellulose was used in place of the separator SP1. Note that the nonaqueous electrolyte was prepared by dissolving $LiPF_6$ in a solution mixture of polycarbonate (PC) and diethyl carbonate (DEC). The mol concentration of $LiPF_6$ in the nonaqueous electrolyte was 1 mol/L, and the volume ratio of PC and DEC was 1:2.

<Evaluation Method>
(Density)

For each of the separators SP1 to SP14, the density was measured by the same method as described above. The result is shown in Table 1.

(Bending Test and Solution Permeation Test)

For each of the separators SP1 to SP14, a bending test was conducted by the same method as described above.

In addition, a solution permeation test was conducted for each test piece after the bending test. More specifically, first, an aqueous electrolyte was dropped on the bent portion of the test piece after the bending test. Next, the bent portion was visually observed to confirm whether the aqueous electrolyte was permeated up to the lower surface of the composite film. Note that as the aqueous electrolyte, the same aqueous electrolyte as that used in Example 1 was used.

At this time, for the test piece, if the composite film did not have a crack and the like, permeation of the aqueous electrolyte was not observed, and a swell of the composite film was not observed, evaluation A was added. In addition, if the composite film did not have a crack and the like, and permeation of the aqueous electrolyte was not observed, but a little swell was observed in the composite film, evaluation B was added. Furthermore, if permeation of the aqueous electrolyte was not observed, and a swell of the composite film was not observed but a small crack was observed in the composite film, evaluation C was added. Additionally, if a crack and the like were not observed in the composite film, but permeation of the aqueous electrolyte was observed, evaluation D was added. The result is shown in Table 1.

Note that in the separator SP14, since the film was ruptured upon bending, the bending test could not be performed.

(Charge-and-Discharge Efficiency Measurement)

The charge-and-discharge efficiency was measured for each of the secondary batteries obtained in the examples and the comparative examples. More specifically, under a 25° C. environment, each secondary battery was charged by a constant current of 5 A until the battery voltage reached 2.8 V. Next, the state was maintained for 30 min. Next, the secondary battery was discharged by a constant current of 5 A until the battery voltage reached 1.5 V. Next, the state was maintained for 30 min. The series of operations was defined as one charge-and-discharge cycle and repeated 50 times. Next, the discharge capacity and charge capacity of the secondary battery after the 50 cycles were measured, and the charge-and-discharge efficiency (discharge capacity/charge capacity) was calculated. The result is shown in Table 2.

Table 1 summarizes data concerning the separators SP1 to SP14.

"particle size (μm)" describes the average particle size of the solid electrolyte particles obtained by the above-described method.

Furthermore, of columns under the heading "polymeric material", a column with a notation "first monomer unit" describes the name of each compound that forms the first monomer unit. In addition, a column with a notation "second monomer unit" describes the name of each compound that forms the second monomer unit. Furthermore, a column with a notation "ratio (mol %)" describes the ratio of a portion of each polymeric material, which belongs to the first monomer unit. Moreover, a column with a notation "functional group" describes the type of each functional group contained in the first monomer unit. In addition, a column with a notation "water absorption capacity" describes a water absorption capacity obtained by the above-described method for each polymeric material.

Furthermore, a column with a notation "type" under the heading "electrolyte salt" describes the type of each electrolyte salt used as the raw material of each composite film.

In addition, a column with a notation "mass ratio of three components" describes the mass ratio of the solid electrolyte particles, the polymeric material, and the electrolyte salt in each composite film.

TABLE 1

| | Solid electrolyte Particles | | Polymeric material | | | | Water Absorption Capacity (%) | Electrolyte salt Type | Mass ratio of three components | Characteristic | |
|---|---|---|---|---|---|---|---|---|---|---|---|
| | Type | Particle Size (μm) | First monomer unit | Second monomer unit | Ratio (mol %) | Functional group | | | | Density (cm³/g) | Solution permeation test |
| SP1 | LATP | 1.0 | Vinyl formal | Absent | 100 | Formal group Acetyl group Hydroxy group | 3 | LiTFSi | 9:1:0.1 | 2.54 | A |
| SP2 | LATP | 1.0 | Vinyl formal | Absent | 100 | Formal group Acetyl group Hydroxy group | 3 | LiTFSi | 8:2:0.1 | 2.42 | A |
| SP3 | LATP | 1.0 | Vinyl formal | Absent | 100 | Formal group Acetyl group Hydroxy group | 3 | Absent | 9:1:0 | 2.53 | A |
| SP4 | LLZ | 1.5 | Vinyl formal | Absent | 100 | Formal group Acetyl group Hydroxy group | 3 | LiTFSi | 9:1:0.1 | 2.54 | A |
| SP5 | LATP | 1.0 | Methyl methacrylate | Absent | 100 | Carbonylmethyl ester group | 0.5 | LiTFSi | 9:1:0.1 | 2.54 | A |
| SP6 | LATP | 1.0 | Vinyl alcohol | Absent | 100 | Hydroxy group | 15 | LiTFSi | 9:1:0.1 | 2.53 | B |
| SP7 | LATP | 1.0 | Vinyl butyral | Absent | 100 | Butyral group Acetyl group Hydroxy group | 2 | LiTFSi | 9:1:0.1 | 2.54 | A |
| SP8 | LATP | 1.0 | Methyl methacrylate | Ethylene oxide | 90 | Carbonylmethyl ester group | 7 | LiTFSi | 9:1:0.1 | 2.53 | A |
| SP9 | LATP | 1.0 | Methyl methacrylate | Ethylene oxide | 70 | Carbonylmethyl ester group | 9.5 | LiTFSi | 9:1:0.1 | 2.52 | A |
| SP10 | LATP | 1.0 | Tetra-fluoroethylene | Absent | 100 | Fluoro group | 0.01 | LiTFSi | 9:1:0.1 | 2.53 | C |
| SP11 | LATP | 1.0 | Methyl methacrylate | Ethylene oxide | 50 | Hydroxy group | 30 | LiTFSi | 9:1:0.1 | 2.51 | D |
| SP12 | LATP | 1.0 | Absent | Ethylene oxide Styrene | 0 | Absent | 8.7 | LiTFSi | 9:1:0.1 | 2.52 | D |
| SP13 | LATP | 1.0 | Absent | Ethylene oxide Styrene | 0 | Absent | 21 | LiTFSi | 9:1:0.1 | 2.51 | D |
| SP14 | LATP | 1.0 | | Absent | | | | Absent | 10:0:0 | 2.72 | — |

Referring to Table 1, of columns under the heading "solid electrolyte particles", a column with a notation "type" describes the type of each compound used as the solid electrolyte particles. In addition, a column with a notation Moreover, of columns under the heading "characteristic", a column with a notation "density (cm³/g)" describes the density of each composite film obtained by the above-described method. A column with a notation "solution permeation test" describes the evaluation result of the above-described bending test and solution permeation test.

Table 2 summarizes data concerning Examples 1 to 17, Comparative Examples 1 to 6, and Reference Example 1.

and mol concentration of each electrolyte salt. In addition, a column with a notation "solvent" describes the type of the solvent of each electrolyte salt, that is, an aqueous type or a nonaqueous type.

TABLE 2

| | Separator | Positive electrode | Negative Electrode | Electrolyte | | Battery characteristic | |
|---|---|---|---|---|---|---|---|
| | | Positive electrode active | Negative electrode active | | | Charge and discharge efficiency | Discharge capacity |
| | Type | material | materials | Electrolyte salt | Solvent | (%) | (mAh/g) |
| Example 1 | SP1 | LiMnO | LTO | 3M LiCl 0.25M LiSO$_4$ | Water | 90 | 165 |
| Example 2 | SP2 | LiMnO | LTO | 3M LiCl 0.25M LiSO$_4$ | Water | 82 | 163 |
| Example 3 | SP3 | LiMnO | LTO | 3M LiCl 0.25M LiSO$_4$ | Water | 80 | 164 |
| Example 4 | SP4 | LiMnO | LTO | 3M LiCl 0.25M LiSO$_4$ | Water | 81 | 166 |
| Example 5 | SP5 | LiMnO | LTO | 3M LiCl 0.25M LiSO$_4$ | Water | 84 | 165 |
| Example 6 | SP1 | LiMnO | LTO 80% TiO$_2$ 20% | 3M LiCl 0.25M LiSO$_4$ | Water | 90 | 133 |
| Example 7 | SP1 | LiMnO | NTO | 3M LiCl 0.25M LiSO$_4$ | Water | 86 | 172 |
| Example 8 | SP1 | LiMnO | LNT | 3M LiCl 0.25M LiSO$_4$ | Water | 84 | 171 |
| Example 9 | SP1 | LiCoO$_2$ | LTO | 3M LiCl 0.25M LiSO$_4$ | Water | 87 | 136 |
| Example 10 | SP1 | LiFePF$_4$ | LTO | 3M LiCl 0.25M LiSO$_4$ | Water | 88 | 132 |
| Example 11 | SP6 | LiMnO | LTO | 3M LiCl 0.25M LiSO$_4$ | Water | 70 | 161 |
| Example 12 | SP1 | LiMnO | LTO | 12M LiCl | Water | 94 | 169 |
| Example 13 | SP7 | LiMnO | LTO | 12M LiCl | Water | 95 | 168 |
| Example 14 | SP8 | LiMnO | LTO | 3M LiCl 0.25M LiSO$_4$ | Water | 81 | 164 |
| Example 15 | SP9 | LiMnO | LTO | 3M LiCl 0.25M LiSO$_4$ | Water | 79 | 164 |
| Example 16 | SP10 | LiMnO | LTO | 3M LiCl 0.25M LiSO$_4$ | Water | 71 | 163 |
| Example 17 | SP1 | LiMnO | LTO | 6M LiCl/LiOH | Water | 91 | 168 |
| Comparative example 1 | NF1 | LiMnO | LTO | 3M LiCl 0.25M LiSO$_4$ | Water | 54 | 162 |
| Comparative example 2 | NF1 | LiMnO | LTO | 12M LiCl | Water | 52 | 161 |
| Comparative example 3 | SP11 | LiMnO | LTO | 3M LiCl 0.25M LiSO$_4$ | Water | 58 | 161 |
| Comparative example 4 | SP12 | LiMnO | LTO | 3M LiCl 0.25M LiSO$_4$ | Water | 60 | 162 |
| Comparative example 5 | SP13 | LiMnO | LTO | 3M LiCl 0.25M LiSO$_4$ | Water | 55 | 162 |
| Comparative example 6 | SP14 | LiMnO | LTO | 3M LiCl 0.25M LiSO$_4$ | Water | — | — |
| Reference example 1 | NF1 | LiMnO | LTO | 1M LiPF$_6$ | Non-water | 99 | 169 |

Referring to Table 2, a column with a notation "type" under the heading "separator" describes the number of each composite film or nonwoven fabric made of cellulose used as a separator.

In addition, a column with a notation "positive electrode active material" under the heading "positive electrode" describes the type of each positive electrode active material. Furthermore, a column with a notation "negative electrode active material" under the heading "negative electrode" describes the type of each negative electrode active material.

Moreover, of columns under the heading "electrolyte", a column with a notation "electrolyte salt" describes the type Furthermore, of columns under the heading "battery characteristic", a column with a notation "charge-and-discharge efficiency (%)" describes a value obtained by dividing the discharge capacity after the 50-cycle test by the charge capacity. A column with a notation "discharge capacity (mAh/g)" describes the discharge capacity after the 50-cycle test.

As shown in Tables 1 and 2, the charge-and-discharge efficiencies of the secondary batteries according to Examples 1 to 17 each using a polymeric material in which the ratio of the first monomer unit was 70 mol % or more were higher than the charge-and-discharge efficiencies of the secondary batteries according to Comparative Examples 1 and 2 each using a nonwoven fabric made of cellulose as the separator and the charge-and-discharge efficiencies of the secondary batteries according to Comparative Examples 3 to 6 in each of which the ratio of the first monomer unit was lower than 70 mol %.

Additionally, as is apparent from Tables 1 and 2, the charge-and-discharge efficiency of the secondary battery according to Example 1 including a composite film containing an electrolyte salt was higher than the charge-and-discharge efficiency of the secondary battery according to Example 3 including a composite film that did not contain an electrolyte salt.

Furthermore, as is apparent from Tables 1 and 2, the charge-and-discharge efficiencies of the secondary batteries according to Examples 1 to 5, 14, and 15 including the separators SP1 to SP5, SP8 and SP9, respectively, in each of which the water absorption capacity of the polymeric material was 0.1% to 10% were higher than the charge-and-discharge efficiencies of the secondary battery according to Example 16 including the separator SP10 in which the water absorption capacity of the polymeric material was lower than 0.1% and the secondary battery according to Example 11 including the separator SP6 in which the water absorption capacity of the polymeric material was higher than 10%.

Additionally, as can be seen from Table 2, the secondary batteries according to Examples 12 and 13 in each of which the concentration of the electrolyte salt was relatively high could implement charge-and-discharge efficiencies similar to that of the nonaqueous electrolyte secondary battery according to Reference Example 1.

As shown in Tables 1 and 2, even when the type of the negative electrode active material, the type of the positive electrode active material, and the type of the electrolyte salt were changed, excellent charge-and-discharge efficiencies could be implemented.

A secondary battery according to at least one of the above-described embodiments includes a positive electrode, a negative electrode, a separator, and an aqueous electrolyte. The positive electrode contains a positive electrode active material. The negative electrode contains a negative electrode active material. The separator is located at least between the positive electrode and the negative electrode. The separator includes a composite film. The composite film includes a mixture of a polymeric material and ion conductive solid electrolyte particles having alkali metal ions conductivity. The polymeric material includes a polymer comprising a monomer unit. The monomer unit is a hydrocarbon with a functional group including at least one element selected from the group consisting of oxygen (O), sulfur (S), nitrogen (N), and fluorine (F). A ratio of the portion formed from the monomer unit in the polymeric material is not less than 70 mol %. The composite film is difficult to make an aqueous solvent permeate and is excellent in lithium ion conductivity. Hence, the secondary battery according to the at least one embodiment can implement a high charge-and-discharge efficiency and safety.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A secondary battery comprising:
a positive electrode containing a positive electrode active material;
a negative electrode containing a negative electrode active material;
a separator located at least between the positive electrode and the negative electrode; and
an aqueous electrolyte,
wherein the separator comprises a composite film containing a mixture of a polymeric material and ion conductive solid electrolyte particles having alkali metal ions conductivity,
the polymeric material comprises a polymer comprising a monomer unit which is a hydrocarbon with a functional group comprising at least one element selected from the group consisting of oxygen (O), sulfur (S), nitrogen (N), and fluorine (F), and a ratio of the polymer in the polymeric material is not less than 70 mol %, and
the positive electrode and the negative electrode are both in contact with the aqueous electrolyte.

2. The secondary battery according to claim 1, wherein the functional group of the monomer unit comprises at least one functional group selected from the group consisting of a formal group, a butyral group, a carboxymethyl ester group, an acetyl group, a carbonyl group, a hydroxy group, and a fluoro group.

3. The secondary battery according to claim 1, wherein the polymeric material comprises a polymer made of the monomer unit, and the polymer is at least one material selected from the group consisting of polyvinyl formal, polyvinyl alcohol, polyvinyl butyral, polymethyl methacrylate, and polytetrafluoroethylene.

4. The secondary battery according to claim 1, wherein the ion conductive solid electrolyte particles comprise at least one of a NASICON type ($Li_{1+x}Al_xTi_{2-x}(PO_4)_3$) where $0.1 \leq x \leq 0.5$ and a garnet type $Li_7La_3Zr_2O_{12}$.

5. The secondary battery according to claim 1, wherein the negative electrode active material comprises a compound whose lithium ion insertion/extraction potential is 1.0 V (vs. Li/Li$^+$) to 3.0 V (vs. Li/Li$^+$) with respect to a potential based on metal lithium.

6. The secondary battery according to claim 1, wherein the positive electrode active material comprises a compound whose lithium ion insertion/extraction potential is 2.7 V (vs. Li/Li$^+$) to 5.5 V (vs. Li/Li$^+$) with respect to a potential based on metal lithium.

7. A battery pack comprising the secondary battery according to claim 1.

8. The battery pack according to claim 7, further comprising:
an external power distribution terminal; and
a protective circuit.

9. The battery pack according to claim 7,
wherein:
the battery pack comprises plural of the secondary batteries; and
the secondary batteries are electrically connected in series, in parallel, or in combination of series and parallel.

10. A vehicle comprising the battery pack according to claim 7.

11. The vehicle according to claim 10, which comprises a mechanism configured to convert kinetic energy of the vehicle into regenerative energy.

12. The secondary battery according to claim 1, wherein the monomer unit is a hydrocarbon with a functional group comprising at least one element selected from the group consisting of oxygen (O), sulfur (S), and nitrogen (N).

13. The secondary battery according to claim 1, wherein the polymeric material comprises a polymer made of the monomer unit, and the polymer is at least one material selected from the group consisting of polyvinyl formal, polyvinyl alcohol, and polyvinyl butyral.

14. The secondary battery according to claim 1, wherein a film thickness of the composite film is 1 μm or more and 100 μm or less.

15. The secondary battery according to claim 1, wherein a ratio of the ion conductive solid electrolyte particles having alkali metal ions conductivity in the composite film is 75 mass % or more, and a ratio of the polymeric material in the composite film is 20 mass % or less.

16. The secondary battery according to claim 1, wherein the ion conductive solid electrolyte particles have lithium ion conductivity.

17. The secondary battery according to claim 1, wherein the ion conductive solid electrolyte particles having alkali metal ions conductivity comprise at least one material selected from the group consisting of a lithium phosphate solid electrolyte having a NASICON structure and represented by a general formula $LiM_2(PO_4)_3$, where M is at least one element selected from the group consisting of Ti, Ge, Sr, Zr, Sn and Al, $Li_{2.9}PO_{3.3}N_{0.46}$, $(Li_{1+x}Al_xTi_{2-x}(PO_4)_3$ where $0<x\leq5$, $Li_{1+x}Al_x Zr_{2-x}(PO_4)_3$ where $0<x\leq5$, $(Li_7La_3Zr_2O_{12})$, β-alumina, a sodium phosphorus sulfide, and a sodium phosphorus oxide.

18. The secondary battery according to claim 1, wherein a water absorption capacity of the polymeric material is 0.1% to 10%.

19. The secondary battery according to claim 1, wherein a ratio of the polymeric material in the composite film is 10 mass % or more and 20 mass % or less.

* * * * *